US006738118B2

(12) United States Patent
Hwang et al.

(10) Patent No.: US 6,738,118 B2
(45) Date of Patent: May 18, 2004

(54) LIQUID CRYSTAL DISPLAY DEVICE

(75) Inventors: In-Sun Hwang, Suwon-si (KR); Yamamura Nobuyuki, Seoul (KR); Sang-Il Kim, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 241 days.

(21) Appl. No.: 09/848,618

(22) Filed: Jul. 10, 2001

(65) Prior Publication Data

US 2002/0140878 A1 Oct. 3, 2002

(30) Foreign Application Priority Data

Mar. 17, 2001 (KR) ........................................ 2001-13875

(51) Int. Cl.[7] .......................................... G02F 1/1335
(52) U.S. Cl. ...................................................... 349/119
(58) Field of Search ............................. 349/62, 61, 119; 345/173; 362/32

(56) References Cited

U.S. PATENT DOCUMENTS 6,111,622 A * 8/2000 Abileah ........................ 349/61
6,359,671 B1 * 3/2002 Abileah ...................... 349/119
6,456,279 B1 * 9/2002 Kubo ........................... 345/173

* cited by examiner

Primary Examiner—John F. Niebling
Assistant Examiner—Andre' C. Stevenson
(74) Attorney, Agent, or Firm—McGuireWoods LLP

(57) ABSTRACT

Disclosed are an apparatus for changing a pathway of light according to a visual field angle to relax a gray scale inversion and for use in a liquid crystal display device in a twisted nematic mode, and the liquid crystal display device having the same. The light pathway partially changing apparatus is disposed on a liquid crystal display panel changes the pathway of the light partially so that a part of the light is substantially transmitted in the same direction as the light proceeds while the rest of the light is transmitted through a changed pathway, in order to change a brightness of the light according to a visual field angle of a liquid crystal display panel to restrain a gray scale inversion of the images while the light passes through the liquid crystal display panel to make the images on the liquid crystal display panel. The rest of the light transmitted through the changed pathway causes to obtain the visual field angle of the liquid crystal display panel, while restrains the gray scale inversion of the images along with the part of the light passing through the liquid crystal display panel in the same direction as that of the light transmitted through a center of the liquid crystal display panel.

22 Claims, 31 Drawing Sheets

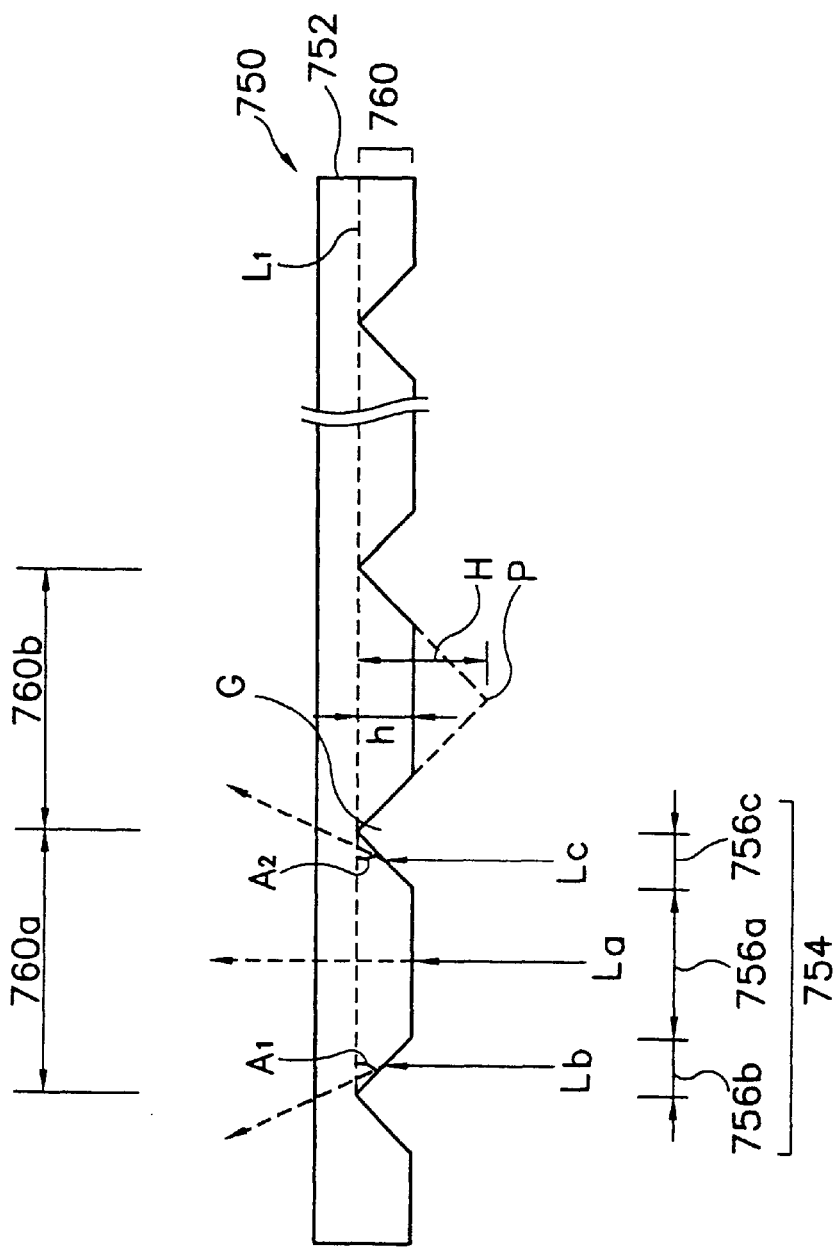

LIQUID CRYSTAL DISPLAY DEVICE

BACKGROUND OF THE INVENTION

1. Field of the Invention

The present invention relates to a liquid crystal display device. More particularly, the present invention relates to a liquid crystal display device having a visual field angle while being capable of restraining or relaxing a gray scale inversion.

2. Description of the Related Art

Generally, the liquid crystal display device applies voltage to the liquid crystal in predetermined molecule arrays to change the liquid crystal in the other arrays, of which the liquid crystal cells undergoes a change of optical characteristics such as a double refractivity, a rotatory polarization, a dichroism and a light scattering according to the molecule arrays of the liquid crystal to emit the light. Therefore, the liquid crystal display device can display the images according to the changes of the optical characteristics of the liquid crystal cell.

The liquid crystal display device is typically divided into a twisted nematic type of the liquid crystal display device and a super twisted nematic type of the liquid crystal display device. According to an operation way, further, the liquid crystal display device is divided into an active matrix display way of the liquid crystal display device using switching elements and twisted nematic liquid crystal and a passive matrix display way of the liquid crystal display device using super twisted nematic liquid crystal.

There is a difference of the active matrix display type of the liquid crystal display device and the passive matrix display way of the liquid crystal display device in that the liquid crystal display device in the active matrix display way uses a thin film transistors as switches to operate liquid crystal while the liquid crystal display device in the passive matrix display way does not use transistors as it does not requires complex circuits. The liquid crystal display device using the thin film transistor is widely used as a lap top computer recently is popularized.

The liquid crystal display device comprises a liquid crystal display panel having liquid crystal to decide whether to transmit light as receiving electric signals. The liquid crystal display panel is a passive element that does not generates the light by itself. Accordingly, a backlight assembly is attached to a surface of the liquid crystal display panel in order to provide the light to the liquid crystal display device. Furthermore, the liquid crystal display panel has a source portion for applying image data to display images and a gate portion for applying gate signals to operate a gate element of the thin film transistor in the liquid crystal display panel, which are attached to the liquid crystal display panel. The liquid crystal in the liquid crystal display panel receives the electric signals when image signals are applied through the source portion and the gate portion to the transistor of the liquid crystal display panel. Thereby, the liquid crystal controls the light from the backlight assembly to make the images.

FIG. 1 is an exploded perspective view of showing a liquid crystal display device according to the conventional art and FIG. 2 is a sectional view of showing a liquid crystal display module of the liquid crystal display device in an assembled state, shown in FIG. 1.

Referring to FIGS. 1 and 2, the liquid crystal display device 100 comprises a liquid crystal display module 200 for displaying images when image signals are applied thereto and front and rear cases 300 and 400 for receiving the liquid crystal display module.

The liquid crystal display module 200 includes a display unit 210 having a liquid crystal display panel for showing the images.

The display unit 210 includes a liquid crystal display panel 212, an integrated and printed circuit board 214, a tape carrier package 216 for date and a ductile printed circuit board 218 for gate. The liquid crystal display panel 212 includes a thin film transistor board 212a, a color filter board 212b and liquid crystal (not shown).

The thin film transistor board 212a is a transparent glass on which the thin film transistors are formed in matrix. Data lines are respectively connected with source terminals of the thin film transistors and gate lines connected with gate terminals of the thin film transistors. Furthermore, pixel electrodes are respectively formed at drain terminals of the thin film transistors, which are made of a transparent conductive material such as Indium Tin Oxide.

As being inputted to the data lines and the gate lines, the electric signals are applied to the source terminals and the gate terminals of each thin film transistor of the thin film transistor board 212a to turn on or turn off the thin film transistors according to an input of electricity, resulting in outputting the electric signals required to form pixels to the drain terminals.

The color filter board 212b is disposed to face to the thin film transistor board 212a in the display unit 210. RGB pixels are formed on the color film board 173 by means of a thin film process, which present a predetermined color while the light passes through the color film board 212b. Common electrodes made of Indium Tin Oxide are coated on the front surface of the color film board 212b.

The color filter board 212b has a compensatory film 213 and a polarizing plate 215 formed on an upper portion to improve a visual field angle.

When the thin film transistors of the thin film transistor board 212a are turned on by applying electricity to the gate terminals and the source terminals of the thin film transistors, electric field is created between the pixel electrodes of the thin film transistor board 212a and the common electrodes of the color filter board 212b. The electric field makes the liquid crystal, which is injected in a space between the thin film transistor board 212a and the color filter board 212b, to change the array angle thereof, resulting in that the permeability of the light is changed. As a result, it is possible to gain the desired pixels.

Meanwhile, a driving signal and a timing signal are applied to the gate lines and data lines of the thin film transistor in order to control the array angle of the liquid crystal and the time of arraying the liquid crystal in the liquid crystal display panel 212. As shown in FIG. 1, the data tape carrier package 216 is attached to the source portion of the liquid crystal display panel 212 to decide a time of applying a data driving signal. On the other hand, the gate tape carrier package 218 is attached to the gate portion of the liquid crystal display panel 212 to decide a time of applying a gate driving signal.

The integrated and printed circuit boards 214 which applies the driving signal to the gate line and the data line as soon as receiving image signals inputted from outside of the liquid crystal display panel 212, comes in contact with the data tape carrier package 216. The integrated and printed circuit board 214 receives the image signals provided from an information process device (not shown) such as a computer and the like and generates the gate driving signal and the data signal for operating the liquid crystal display device and a plurality of timing signals for applying the gate driving signal and the data signal to the gate lines and the data lines of the liquid crystal display panel 212.

The backlight assembly 220 is disposed under the display unit 210 to supply the light to the display unit 220 uniformly. The backlight assembly 220 includes a line typed lamp 222 which is disposed at an end of a liquid crystal display module 200, for generating the light.

A light guide plate 224 has a size corresponding to that of the liquid crystal display panel 212 of the display unit 210 and has a thickness which is gradually reduced from an end adjacent to the lamp 222 to the other end being far away from the lamp 222. The light guide plate 224 is disposed under the liquid crystal display panel 212 so as to guide the light generated by the lamp 222 to the display unit 210 while changing the pathway of the light.

A plurality of optical sheets 226 for making a brightness of the light, which is transmitted from the light guide plate 224, to be uniform is provided on the light guide plate 224. Further, a light reflecting plate 228 is provided under the light guide plate 224 to reflect a leaked light to the light guide plate 224 so as to improve the efficiency of the light.

The display unit 210 and the backlight assembly 220 are fixedly supported by means of a mold frame 230. The mold frame 230 has a rectangular tetragonal shape and an opening at a top portion thereof. That is, the mold frame 230 has four sidewalls and a bottom wall on which openings are formed so that the integrated and printed circuit board 214 is bent along an outer surface of the mold frame 230 to be received through the openings in the mold frame 230.

A chassis 240 is provided for the mold frame 230 in order to fix the integrated and printed circuit board 214 and the gate tape carrier package 218 of the display unit 210 to the bottom wall of the mold frame 230 while to bend the integrated and printed circuit board 214 and the gate tape carrier package 218 toward the outside of the mold frame 230.

The chassis 240 has a rectangular tetragonal shape similar to the mold frame 230, of which an upper surface is opened to expose the liquid crystal display panel 212 and sidewalls are inwardly bent to cover a peripheral surface of the liquid crystal display panel 212.

To assemble the liquid crystal display device, firstly, the backlight assembly 220 is received in the mold frame 230, on which in turn the display unit 210 is disposed. Next, the integrated and printed circuit board 214 connected through the data tape carrier package 216 to the display unit 210 is mounted in the openings formed in the bottom wall of the mold frame 230 while being bent along the outer surface of the sidewall of the mold frame 230. Finally, the chassis 240 is combined with the mold frame 230 so that the display unit 210 and the backlight assembly 220 are fixed to the mold frame 230.

At that time, the ductile circuit board 218 for gate, which is attached to the gate of the display unit 210, is fixed to the bottom wall of the mold frame 230 with enclosing the outer surfaces of the mold frame 230. An adhesive tape or a separate fixing member is used for fixing the ductile circuit board 218 for gate to the mold frame 230 in order to prevent the ductile circuit board 218 from departing from the mold frame 230.

The liquid crystal display device 100 according to the conventional art as described above has a compensative film 213 including a discotic layer in order to improve the visual field angle. In the case of using the compensative film 213, it is possible to improve the visual field angle relating to the contrast ratio. However, when the voltage is increased, it is difficult to improve a gray scale inversion in that the brightness of the light is rather reduced. Furthermore, in the case of a two domain twisted nematic mode, when the compensative film is used for improving the visual field angle, the compensated domain and the non-compensated domain are simultaneously presented in the liquid crystal display panel 212. Accordingly, there are problems in that even though it is possible to improve the visual field angle, it is impossible to improve the gray scale inversion and in that on the contrary when the gray scale inversion is improved, it is impossible to improve the visual field angle.

SUMMARY OF THE INVENTION

The present invention has been made to solve the aforementioned problems, and accordingly it is the object of the present invention to provide an apparatus for changing a pathway of light of a liquid crystal display device capable of changing a brightness of light according to a visual field angle to relax a gray scale inversion.

It is the other object of the present invention to provide a liquid crystal display device having the device for changing the pathway of the light.

In order to achieve the object of the present invention, there is provided an apparatus for changing a pathway of light according to an aspect of the present invention, in which a part of the light is substantially transmitted in the same direction as the light proceeds while the rest of the light is transmitted through a changed pathway, in order to change a brightness of the light according to a visual field angle of the display panel to restrain a gray scale inversion of the images while the light passes through the display panel to make the images on the display panel, the means being disposed on the display panel.

The object of the present invention can be achieved by means of a film sheet for use in a display device comprising a transparent base film; and a step section having inclined side portions formed on a surface of the transparent base film, wherein a part of light is substantially transmitted in the same direction as the light proceeds while the rest of the light is transmitted through a changed pathway in order to change a brightness of the light according to a visual field angle of a display panel to restrain a gray scale inversion of the images while the light passes through the transparent base film.

In order to achieve the other object of the present invention, there is a display device according to the other aspect of the present invention, which comprises a display panel for displaying images, a backlight assembly for providing light to the display panel, and means for changing a pathway of the light partially so that a part of the light is substantially transmitted in the same direction as the light proceeds while the rest of the light is transmitted through a changed pathway, in order to change a brightness of the light according to a visual field angle of the display panel to restrain a gray scale inversion of the images while the light passes through the display panel to make the images on the display panel, the means being disposed on the display panel.

The other object of the present invention can be achieved by means of a liquid crystal display device comprising: a liquid crystal display panel for receiving light to display images, the light crystal display panel including a first transparent substrate, a second transparent substrate mounted to face to the first transparent substrate and liquid crystal injected between the first transparent substrate and the second transparent substrate; a backlight assembly for providing the light to the liquid crystal display panel through the first transparent substrate; and light pathway partially changing means, disposed on an outer surface of the second transparent substrate, so that a part of the light is substantially transmitted in the same direction as the light proceeds while the rest of the light is transmitted through a changed pathway, in order to improve a contrast ratio of the images displayed on the liquid crystal display panel while the light passes through the liquid crystal display panel.

According to the present invention, a part of the light passing through the liquid crystal is substantially transmitted at a center portion of a projection in the same direction as the light proceeds and the rest of the light is transmitted through a changed pathway at a peripheral portion of the projection. The rest of the light having the changed pathway makes the visual field angle of the liquid crystal display panel to be ensured, while relaxing the gray scale inversion along with the part of the light passing through the center portion of the projection.

BRIEF DESCRIPTION OF THE DRAWINGS

The above and other objects and advantages of the present invention will become readily apparent by reference to the following detailed description when considered in conjunction with the accompanying drawings wherein:

FIGS. 5a and 5b are sectional views of showing a member for changing a pathway of light partially according to first and second embodiments of the present invention;

DETAILED DESCRIPTION OF THE PREFERRED EMBODIMENT

Hereinafter, the present invention will be described in detail with reference to the accompanying drawings.

Figure 1:
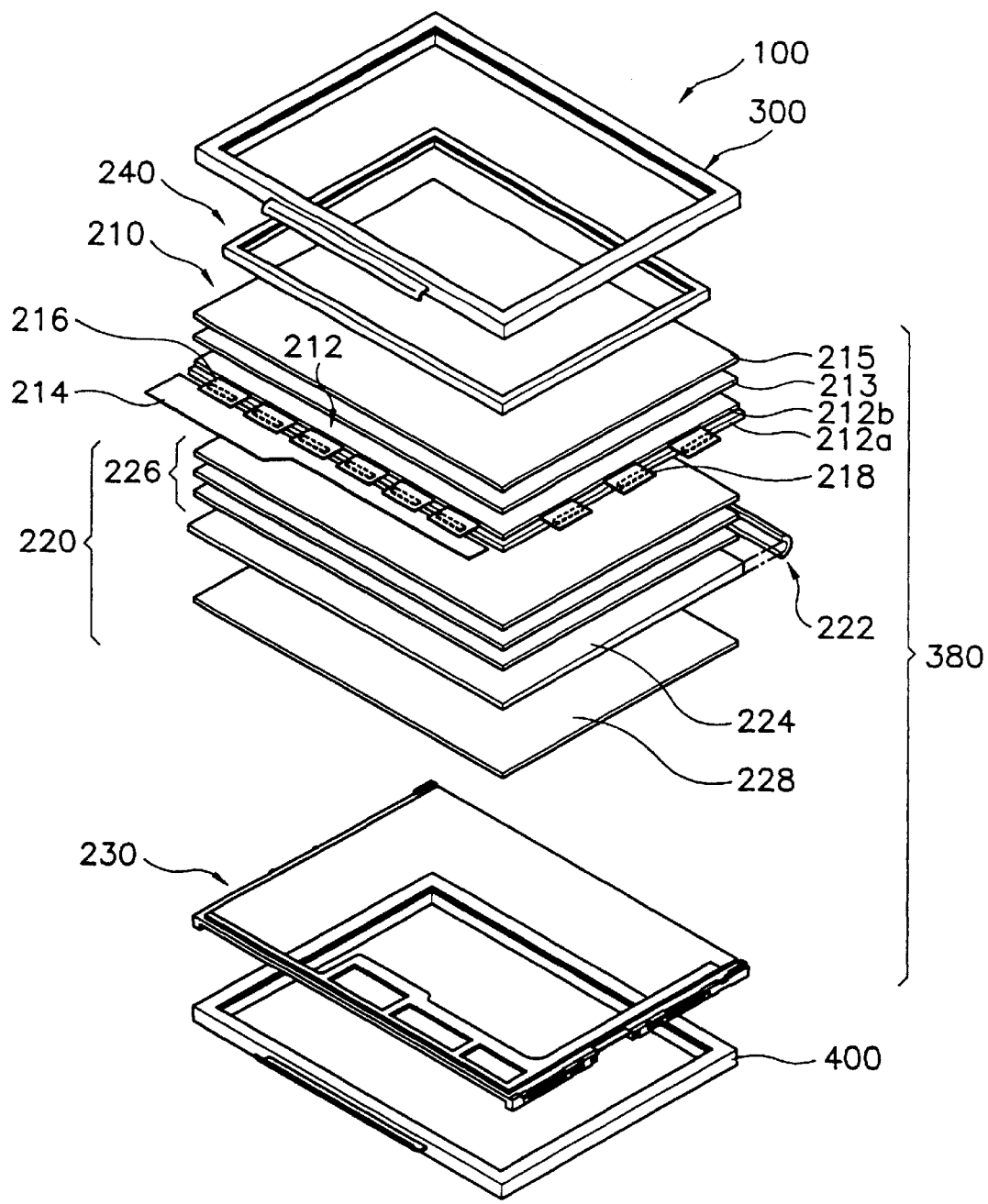
FIG. 1 is an exploded perspective view of showing a liquid crystal display device according to the conventional art.
Figure 2:
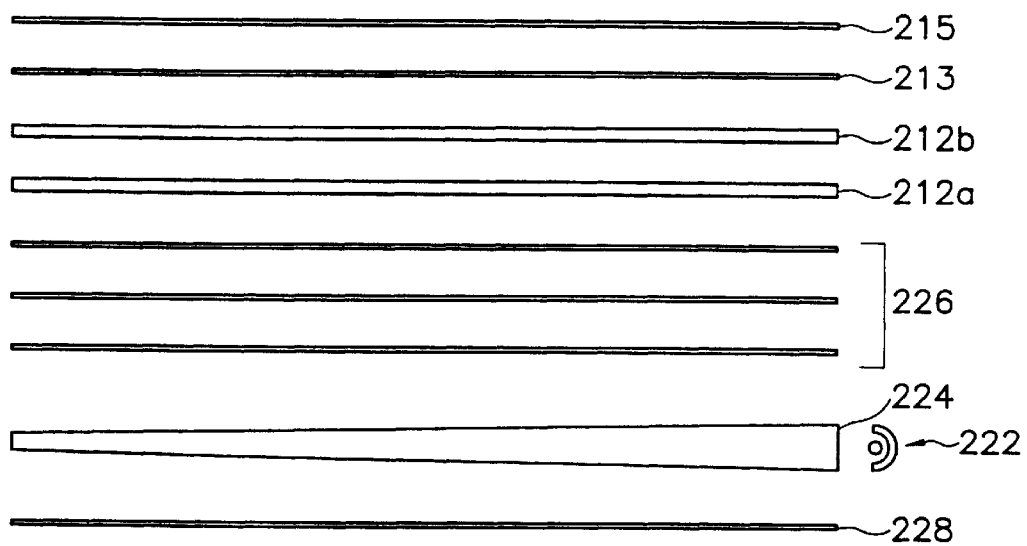
FIG. 2 is a sectional view of showing a liquid crystal display module of the liquid crystal display device shown in FIG. 1 in an assembled state, schematically.
Figure 3:
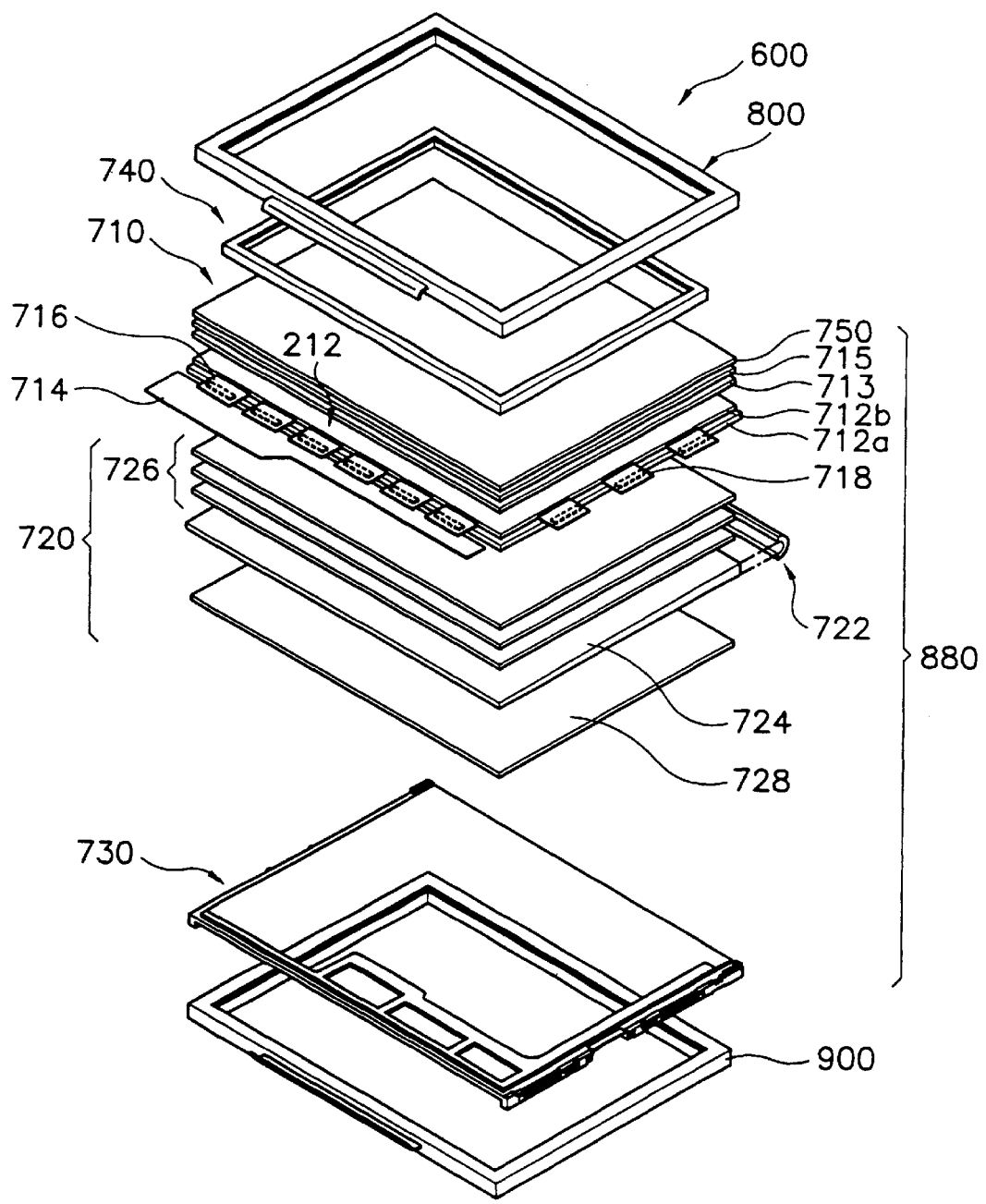
FIG. 3 is an exploded perspective view of showing a liquid crystal display device according to an embodiment of the present invention.
Figure 4:
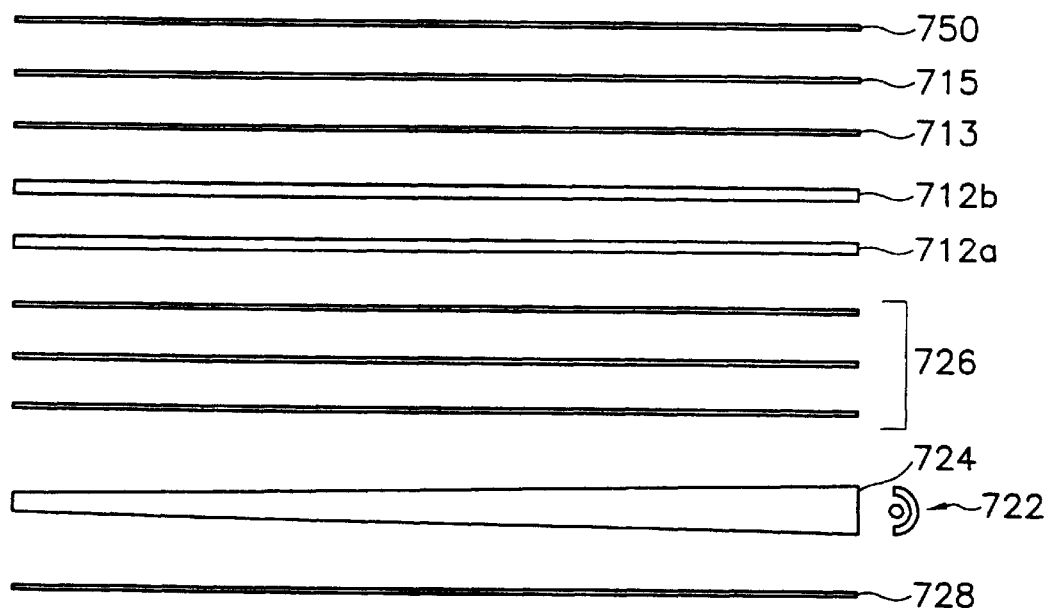
FIG. 4 is a sectional view of showing the liquid crystal display device shown in FIG. 3 in an assembled state, schematically.

FIG. 3 is an exploded perspective view of showing a liquid crystal display device according to an embodiment of the present invention and FIG. 4 is a view of showing the liquid crystal display device in an assembled state in FIG. 3, schematically.

Referring to FIGS. 3 and 4, the liquid crystal display device 600 includes a liquid crystal display module 700 for displaying images when an image signal is applied thereto and front and rear cases 800 and 900, for receiving the liquid crystal display module 700.

The liquid crystal display module 700 has a display unit 710 including a liquid crystal display panel that shows images.

The display unit 710 comprises a liquid crystal display panel 712, an integrated and printed circuit board 714, a data tape carrier package 716 and a ductile circuit board 718 for gate that is fabricated in a COF process.

The liquid crystal display panel 712 includes a thin film transistor board 712a, a color filter board 712b and liquid crystal (not shown).

The thin film transistor board 712a is a transparent glass substrate on which thin film transistors in matrix are formed. A data line is connected with a source terminal of the thin film transistors and a gate line is connected with a gate terminal of the thin film transistors. Furthermore, pixel electrodes made of Indium Tin Oxide, which is a transparent and conductive material, are formed at a drain terminal of the thin film transistors.

When electric signals are applied to the data line and the gate line, the electric signals are input into the source terminal and the gate terminal of the respective thin film transistor. As the electric signals are input into the thin film transistors, the thin film transistors are respectively turned-on or turned-off, resulting in outputting the electric signals, which are required to form pixels, to the drain terminals.

The color filter board 712b is provided to face to the thin film transistor board 712a. The color filter board 712b has RGB pixels, which are formed by a thin film process to present desired colors while the light passes through the color filter board 712b. A surface of the color filter board 712b is coated with common electrodes made of Indium Tin Oxide.

When the electricity is applied to the gate and source terminals of the transistor on the thin film transistor board 712a to turn on the thin film transistor, an electric field is created between the pixel electrodes and common electrodes of the color filter board 712b. This electric field causes to change an array angle of the liquid crystal injected between the thin film transistor board 712a and the color filter board 712b, resulting in that a light permeability depending on the changed array angle also is changed so as to gain a desired pixels.

A driving signal and a timing signal are applied to the gate line and the data line of the thin film transistor in order to control the array angle of the liquid crystal of the liquid crystal display panel 712 and the time at which the liquid crystal is arranged in the liquid crystal display panel 712. As shown in FIGS. 3 and 4, the data tape carrier package 716 is attached to the source portion of the liquid crystal display panel 712 to decide a time at which a data driving signal is applied to the liquid crystal display panel 712. On the other hand, the ductile circuit board 718 for gate, which is fabricated by the COF process, is attached to the gate portion of the liquid crystal display panel 712 to decide a time at which a gate driving signal is applied to the liquid crystal display panel 712.

The integrated and printed circuit board 714, which applies the driving signal to the gate line and the data line as soon as receiving image signals inputted from outside of the liquid crystal display panel 712, come in contact with the data tape carrier package 278 for the data line in the liquid crystal display panel 712. A source portion and a gate portion are formed on the integrated and printed circuit board 714. The source portion receives the image signals from an information process device (not shown) such as a computer, etc. and then provides the data driving signal for the liquid crystal display panel 712. The gate portion provides the gate driving signal for the gate line of the liquid crystal display panel 712. That is, the integrated and printed circuit board 714 generates the gate driving signal and the data signal for driving the liquid crystal display device and the plural timing signals for applying the gate driving signal and the data signal in time, so as to apply the gate driving signal through the ductile circuit board 718 for gate to the gate line of the liquid crystal display panel 712 and the data signal through the data tape carrier package 716 to the data line of the liquid crystal display panel 712.

A backlight assembly 720 is disposed under the display unit 710 to supply the light to the display unit 710 uniformly. The backlight assembly 720 includes a line typed lamp 722 that is disposed at a side of the liquid crystal display module 700 and has a thickness which is gradually reduced from an end adjacent to the lamp 272 to the other end being far away from the lamp 722. The light guide plate 724 is disposed under the liquid crystal display panel 712 so as to guide the light generated by the lamp 722 to the display unit 710 while changing the pathway of the light.

A plurality of optical sheets 726 is disposed on the light guide plate 724 to make a brightness of the light transmitted from the light-guide plate 724 to the liquid crystal display panel 712 to be uniform. Furthermore, a light reflecting plate 728 is provided under the light guide plate 724 in order to reflect the light, which is leaked from the light guide plate 724, to the light guide plate 724, resulting in increasing the light efficiency.

The display unit 710 and the backlight assembly 720 are fixedly supported by means of a mold frame 730. The mold frame 730 has a rectangular tetragonal shape and an opening at a top portion thereof. That is, the mold frame 730 has four sidewalls and a bottom wall on which openings are formed so that the integrated and printed circuit board 714 is bent along an outer surface of the mold frame 730 to be received through the openings in the mold frame 730.

A chassis 740 is provided for the mold frame 730 in order to fix the integrated and printed circuit board 714 and the gate tape carrier package 718 of the display unit 710 to the bottom wall of the mold frame 730 while to bend the integrated and printed circuit board 714 and the gate tape carrier package 718 toward the outside of the mold frame 730.

The chassis 740 has a rectangular tetragonal shape similar to the mold frame 730, of which an upper surface is opened to expose the liquid crystal display panel 712 and sidewalls are inwardly bent to cover a peripheral surface of the liquid crystal display panel 712.

To assemble the liquid crystal display device, firstly, the backlight assembly 720 is received in the mold frame 730, on which in turn the display unit 710 is disposed. Next, the integrated and printed circuit board 714 connected through the data tape carrier package 716 to the display unit 710 is mounted in the openings formed in the bottom wall of the mold frame 730 while being bent along the outer surface of the sidewall of the mold frame 730. Finally, the chassis 740 is combined with the mold frame 730 so that the display unit 710 and the backlight assembly 720 are fixed to the mold frame 730.

At that time, the ductile circuit board 718 for gate, which is attached to the gate of the display unit 710, is fixed to the bottom wall of the mold frame 730 with enclosing the outer surfaces of the mold frame 730.

As described above, the color filter board 712b has a compensative film 713 and a polarizing plate 715 for improving a visual field angle which are disposed on a surface of the color filter board 712b.

A member 750 for changing a pathway of the light partially is provided on the polarizing plate 715. FIG. 5a is an exploded sectional view of illustrating the member for changing the pathway of the light partially in detail according to the first embodiment of the present invention shown in FIGS. 3 and 4.

Referring to FIG. 5a, a member 750 for changing the pathway of the light partially, which is provided as an upper board of the liquid crystal display panel 712 on the upper surface of the color filter board 712b, substantially transmits the part of the light in the same direction as that in which the light proceeds, while changing the pathway of the rest of the light. As shown in FIG. 5a, the member 750 for changing the pathway of the light partially includes a transparent base film 752 and a plurality of projections 754 formed on a bottom surface of the transparent base film 752 that is in contact with the liquid crystal display panel 712 to be placed under the transparent base film 752.

The plurality of the projections 754 has a striped shape, which is continuously formed. The projections 754 respectively include a horizontal portion 756a, a first inclined portion 756b and a second inclined portion 756c. The horizontal portion 756a defines a first region having a striped shape to transmit the first light L1, which passes through the liquid crystal display panel 712, in the same direction as that in which the light proceeds straight ahead. The horizontal portion 756a may be rendered inclined somewhat if the first light L1 having passed through the liquid crystal display panel 712 can be substantially transmitted through the horizontal portion 756a in the same direction as that in which the light proceeds straight ahead. The first inclined portion 756b is provided at a left side of the horizontal portion 756a in FIG. 5a, which defines a second region that changes the pathway of the second light L2 having passed through the liquid crystal display panel 712 to the left in FIG. 5a and transmits the second light L2 left. The second inclined portion 756c is formed at a right side of the horizontal portion 756a in FIG. 5a, which defines a third region that changes the pathway of the third light L3 having passed through the liquid crystal display panel 712 to the right in FIG. 5a. As described above, as the first and second inclined portions 756b and 756c change the pathway of the light having passed through the liquid crystal display panel 712, the light displaying images is dispersed uniformly, resulting in improving the visual field angle.

The horizontal portion 756a forming the first region, the first inclined portion 756b forming the second region and the second inclined portion 756c forming the third region configure a single stripe-shaped region 760a for changing the pathway of the light. A region 760 for changing the pathway of the light is integrated with the member 750 for changing the pathway of the light partially. Widths of the single regions 760a, 760b, 760c, . . . preferably is smaller than a length of a unit pixel.

Furthermore, the horizontal portion 756a, the first inclined portion 756b and the second inclined portion 756c are projected from the base film 752 to the liquid crystal display panel 712 and have a mesa shape in a sectional view. The second inclined portion 756c of the light pathway changing region 760a and the first inclined portion 756b of the light pathway changing region 760b adjacent to the light pathway changing region 760a define grooves G having a triangle shape in a sectional view. The grooves G are formed in a striped shape similar to the light pathway changing region 760. Accordingly, a vertical distance from a line L1 connecting apexes of the grooves G to the horizontal portion 756a is defined as a height h of the mesa shaped projections 754. In addition, the line L1 is an extending line connecting bases of the mesa shaped projections to one another.

A point at which the first inclined portion 756b and the second inclined portion 756c extend and are imaginary intersected each other forms an apex of a prism. A vertical distance from the apex of the prism to the base of the projection (for example, a base of the prism) is defined by a height H of the prism.

If a ratio of the height h of the mesa shaped projection 754 to the height H of the prism is less than 0.05, an effect of changing the pathway of the light is hardly gained by the first and second inclined portions 756b and 756c. Furthermore, if the ratio of the height h of the mesa shaped projection 754 to the height H of the prism is more than 0.7, an effect of straightening the light is hardly achieved. Accordingly, the ratio of the height h of the mesa shaped projection 754 to the height H of the prism preferably is in a range of about 0.05 to 0.7.

On the other hand, the first and second inclined portions 756b and 756c come in contact with the line L1 at a predetermined angle. An inner angle at a point at which the first inclined portion 756b intersects the line L1 is defined as an angle A1 and an inner angle at a point at which the second inclined portion 756c intersects the line L1 is defined as an angle A2. If the angles A1 and A2 respectively are less than ten degrees, each area of the first and second inclined portions 756b and 756c is significantly increased. It is not preferable that the angles A1 and A2 are less than ten degrees since the regions for changing the pathway of the light is wide. To the contrary, if the angles A1 and A2 are more than eighty degrees, each area of the first and second inclined portions 756b and 756c is significantly decreased. It is not preferable that the angles A1 and A2 are more than eighty degrees since the regions for changing the pathway of the light is reduced to hardly improve the brightness of the light according to the visual field angle. Accordingly, the angles A1 and A2 preferably are in the range of ten to eighty degrees. At that time, it is possible that the angle A1 is equal to or different from the angle A2.

In the case that the angle A1 is different from the angle A2, if a sum of the angle A1 and the angle A2 is less than twenty degrees, an area of the first and second inclined portions 756b and 756c is increased. As a result, the region for changing the pathway of the light is significantly wide. To the contrary, if the sum of the angle A1 and the angle A2 is more than one hundred sixty degrees, the first and second inclined portions 756b and 756c is significantly decreased. As a result, the region for changing the pathway of the light is reduced to hardly improve the brightness of the light according to the visual field angle. Accordingly, it is preferable that the sum of the angle A1 and the angle A2 is in the range of twenty degrees to one hundred sixty degrees.

The base film 752 and the projections 754 can be integrally formed of an identical material. If the base film 752 is made of the same material as that of the projections 754, it is preferable to use a high-polymer material having a refractive index more than 1.4 and a high transparency as that of the base film 752 and the projection 754. An acrylic resin is exampled as one of the high-polymer material.

Figure 5B:
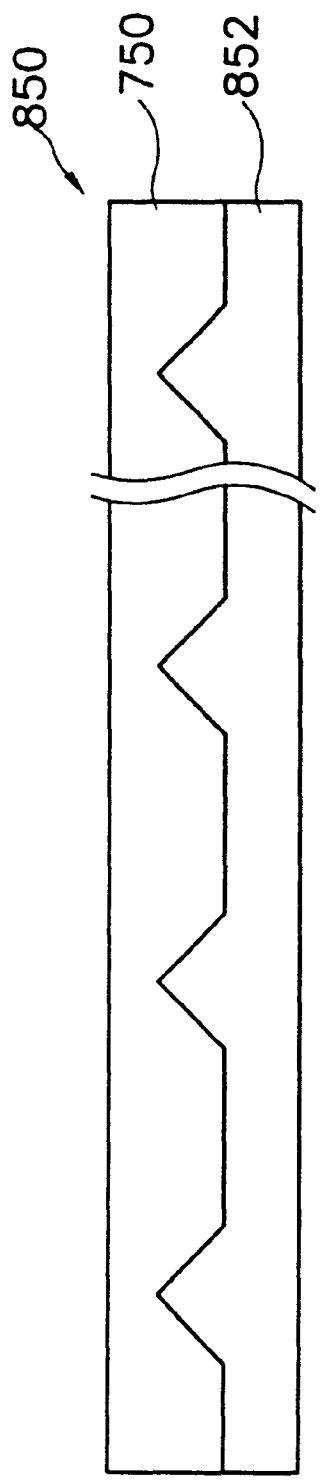

FIG. 5b is a sectional view of showing a member 850 for changing a pathway of light partially according to the second embodiment of the present invention. The member 850 for changing the pathway of the light partially shown in FIG. 5b is identical with the member 750 for changing the pathway of the light partially shown in FIG. 5a, except that a protective film 852 is coated on the member 750 for changing the pathway of the light partially according to the first embodiment of the present invention to cover the projections 754.

Referring to FIG. 5b, the member 850 for changing the pathway of the light partially further includes the protective film 852 in order to ensure a stability of the base film 752 when the polarizing plate 715 is attached to the base film 752 including the projections 754.

It is preferable to form the base film 752 and the protective film 852 respectively with a different material. In the case of forming the base film 752 and the protective film 852 respectively with a different material, preferably, the refractive index of the material of which the base film 752 is made is higher than that of the material of which the protective film 852 is made. For example, the base film 752 is made of the material of which the refractive index is more than 1.5 while the protective film 852 is formed of the material of which the refractive index is less than 1.35. A photosensitive polymer type material is used as the material of the base film 752, of which the refractive index is more than 1.5 and a fluorine-containing polymer type material is used as the material of the protective film 852, of which the refractive index is less than 1.35. An acrylic resin such as a polymethylmethacrylate is used as the photopolymer material and a soluble amorphous fluoropolymer resin is used as the fluoric polymer material. An example of the fluoropolymer resin is available of Teflon AF (a trademark), Dupont Company.

The protective film 852 is placed between the base film 752 and the polarizing plate 715 to carry out a function of fixing the base film 752 to the polarizing plate 715. A separate member may be used to fix the base film 752 to the polarizing plate 715. When the protective film 852 is made of a material having an adhesiveness, however, the base film 752 can be fixed to the polarizing plate 715 by means of the protective film 852 without use of the separate member. According to the preferred embodiment of the present invention, the protective film 852 can be made of the material having the adhesiveness. The material having the adhesiveness, for example, can be made to contain the fluoride acrylic resin.

Figure 6A:
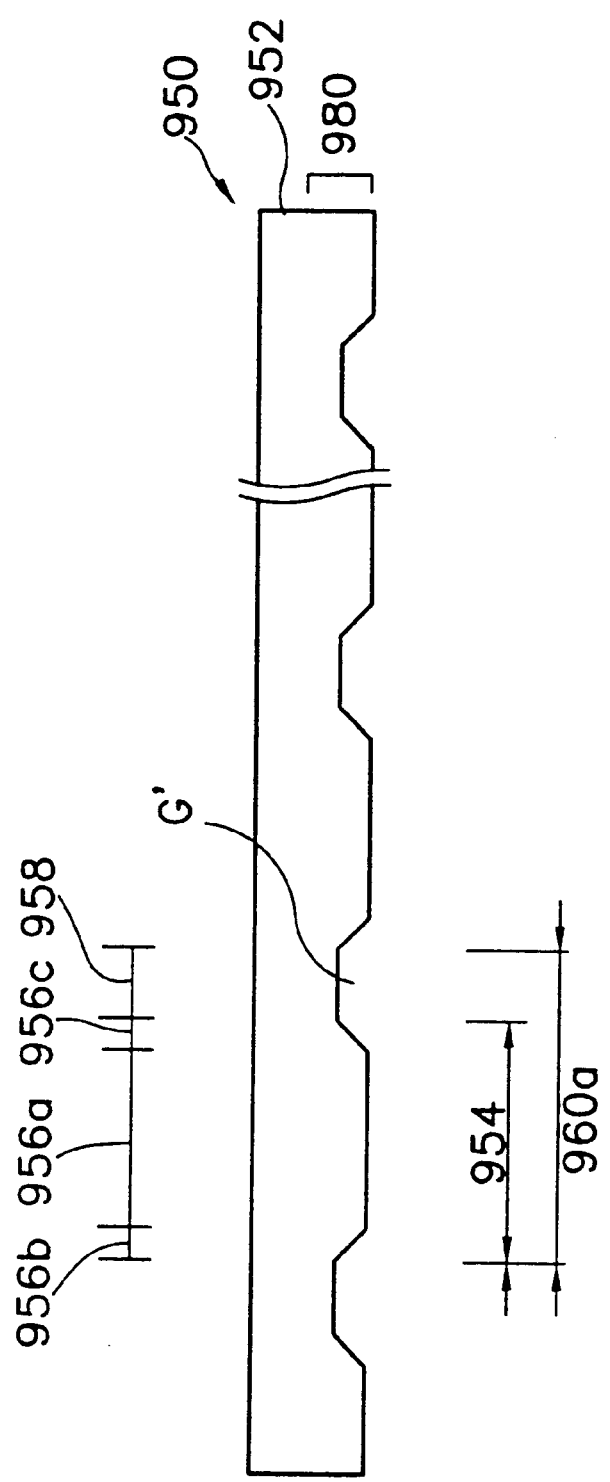
FIGS. 6a and 6b are sectional views of showing a member for changing a pathway of light partially according to third and fourth embodiments of the present invention.

FIG. 6a is a sectional view of showing the member 950 for changing the pathway of the light partially according to the third embodiment of the present invention. The member for changing the pathway of the light partially shown in FIG. 6a is identical with the member 750 for changing the pathway of the light partially according to the first embodiment of the present invention, except that a fourth region 958 having a striped shape is formed between the light pathway changing regions 760a and 760b shown in FIG. 5a in order to transmit the light in the same direction as the light proceeds straight.

To describe the member 950 in detail referring to FIG. 6a, the member 950 for changing the pathway of the light partially according to the embodiment of the present invention transmits the part of the light in the same direction as the light proceeds straight similarly to the member 750 for changing the pathway of the light partially of the first embodiment of the present invention and another part of the light through the changed pathway. The member 950 for changing the pathway of the light partially shown in FIG. 6a includes a transparent base film 952 and a plurality of projections 954 that is integrally formed on a bottom surface of the transparent base film 952 to face to the liquid crystal display panel.

The projections 954 have a striped shape and are continuously formed on the bottom surface of the transparent base film 952. The projections 954 respectively have a first horizontal portion 956a a first inclined portion 956b and a second inclined portion 956c. A striped shaped-second horizontal portion 958 (or a bottom surface portion) is formed between the projections 954 to be parallel with the first horizontal portion 956a, so as to transmit the light in the same direction as that in which the light proceeds straight. The first horizontal portion 956a and the second horizontal portion 958 define a first region having a striped shape to transmit the first light L1, which passes through the liquid crystal display panel, in the same direction as that in which the light proceeds straight. The first inclined portion 956b is provided at a left side of the first horizontal portion 956a in FIG. 6a, which defines a second region that changes the pathway of the second light L2 having passed through the liquid crystal display panel into the left in FIG. 6a and transmits the second light L2 left. The second inclined portion 956c is formed at a right side of the first horizontal portion 956a in FIG. 6a, which defines a third region that changes the pathway of the third light L3 having passed through the liquid crystal display panel to the right in FIG. 6a. As described above, as the first and second inclined portions 956b and 956c change the pathway of the light having passed through the liquid crystal display panel, the light displaying images is dispersed uniformly, resulting in improving the visual field angle.

The first and second horizontal portions 956a and 958 forming the first region, the first inclined portion 956b forming the second region and the second inclined portion 956c forming the third region configure a single striped shaped region 960a for changing the pathway of the light. A region 960 for changing the pathway of the light is integrated with the member 950 for changing the pathway of the light partially. Widths of the single regions 960a, 960b, 960c, ... preferably is smaller than a length of a unit pixel.

Furthermore, the projections 954 respectively including the first horizontal portion 956a, the first inclined portion 956b and the second inclined portion 956c are projected from the base film 952 to the liquid crystal display panel and have a mesa shape in a sectional view. The second inclined portion 956c of the light pathway changing region 960a and the first inclined portion 956b and the second horizontal portion 958 of the light pathway changing region 960b adjacent to the light pathway changing region 960a define grooves G' having a reversed mesa shape in a sectional view. The grooves G' are formed in a striped shape to be parallel with one another similarly to the light pathway changing region 960. Accordingly, each bottom surface of the grooves G' configures the second horizontal portion 958.

At that time, the first horizontal portion 956a, the first inclined portion 956b, the second inclined portion 956c and the second horizontal portion 958 define a single light pathway changing region of which width preferably is smaller than a length of a unit pixel.

Figure 6B:
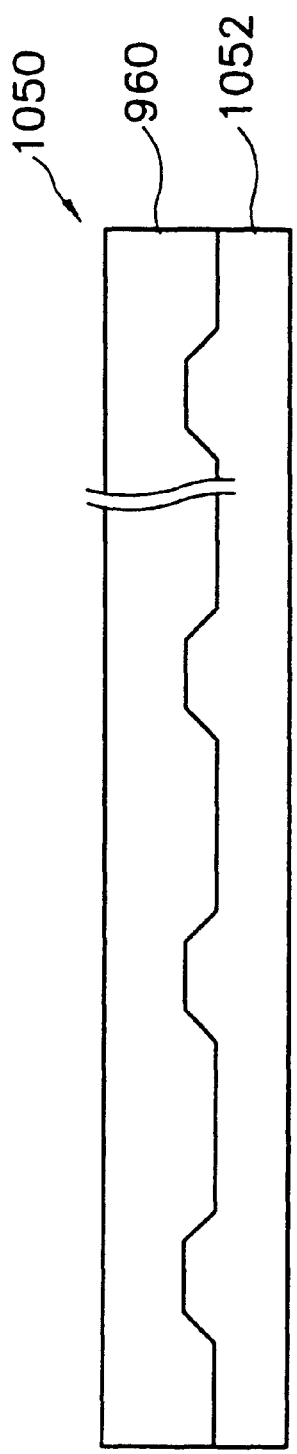

FIG. 6b is a sectional view of showing a member 1050 for changing a pathway of light partially according to the fourth embodiment of the present invention. The member for changing the pathway of the light partially shown in FIG. 6b is identical with the member for changing the pathway of the light partially shown in FIG. 6a, except that the member 1050 for changing the pathway of the light partially further includes a protective film 1052 for covering the projections 954 while flattening the member 950 as shown in FIG. 5b.

Figure 7A:
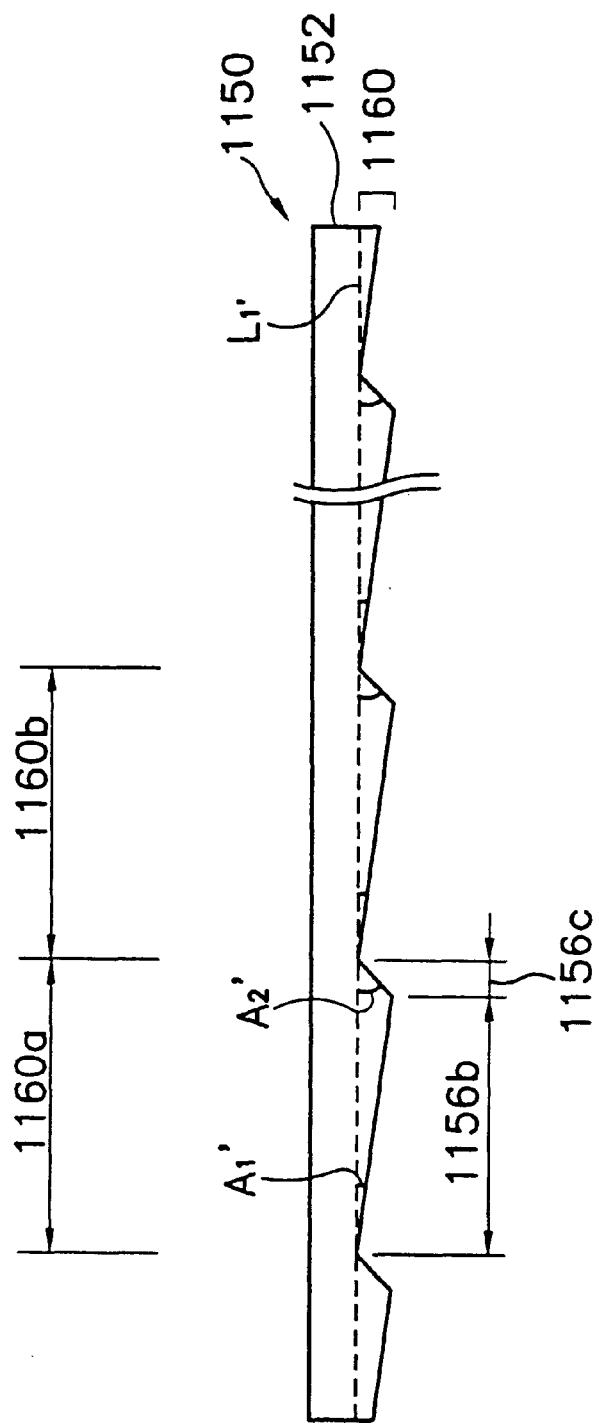
FIGS. 7a and 7b are sectional views of showing a member for changing a pathway of light partially according to fifth and sixth embodiments of the present invention.

FIG. 7a is a sectional view of showing the member 1150 for changing the pathway of the light partially according to the fifth embodiment of the present invention.

Referring to FIG. 7a, the member 1150 for changing the pathway of the light partially according to the embodiment of the present invention transmits a part of the light at a first region 1156b thereof in the same direction as that in which the light proceeds straight ahead and the other part of the light through a changed pathway at a second region 1156c. As shown in FIG. 7a, the member 1150 for changing the pathway of the light partially includes a transparent base film 1152 and a plurality of projections 1160 formed on a bottom surface of the transparent base film 1152 to face to the liquid crystal display panel that is placed under the transparent base film 1152.

The plurality of the projections 1160 has a striped shape, which is continuously formed. The projections 1160 respectively include a first inclined portion 1156b having a relative long length and a second inclined portion 1156c having a relative short length. The first inclined portion 1156b transmits a first light L1, which has passed through the liquid crystal display panel, in the same direction as that in which the light proceeds straight. The second inclined portion 1156c defines a second region that changes the pathway of the light, which has passed through the liquid crystal display panel, to the right in FIG. 7a. As described above, as the first and second inclined portions 1156b and 1156c change the pathway of the light having passed through the liquid crystal display panel, the light displaying images is dispersed uniformly, resulting in improving the visual field angle.

The first inclined portion 1156b forming the first region and the second inclined portion 1156c forming the second region configure a single striped shaped region 1160a for changing the pathway of the light. Widths of the single regions 1160a, 1160b, 1160c, ... preferably is smaller than a length of a unit pixel.

The first and second inclined portions 1156b and 1156c are projected from the base film 1152 to the liquid crystal display panel, of which a profile is an asymmetric triangle shape.

On the other hand, the first and second inclined portions 1156b and 1156c come in contact with the imaginary line L1' that connects apexes of the projections 1160 with one anther at predetermined angles. An inner angle at a point at which the first inclined portion 1156b meets the imaginary line L1' is defined as an angle A1' and an inner angle at a point at which the second inclined portion 756c meets the imaginary line L1' is defined as an angle A2'. As described above, the angles A1' and A2' respectively are in the range of ten degrees to eighty degrees.

Figure 7B:
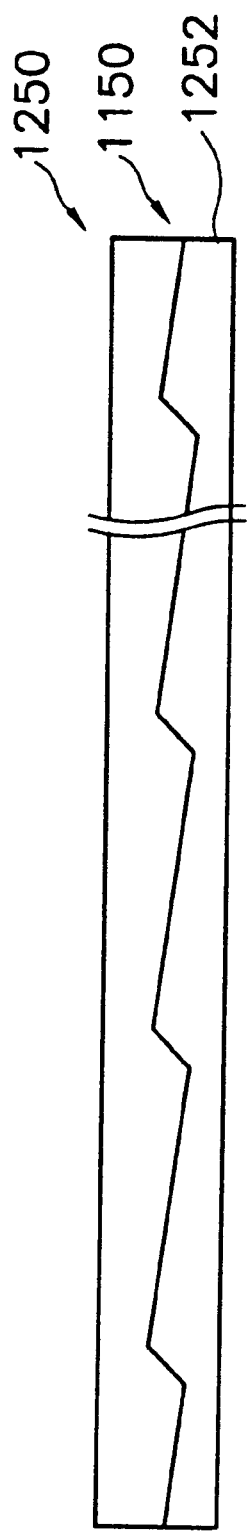

FIG. 7b is a sectional view of showing a member 1250 for changing the pathway of light partially according to the sixth embodiment of the present invention The member 1250 for changing the pathway of the light partially according to the embodiment of the present invention is identical with the member for changing the pathway of the light partially shown in FIG. 7A, except that the member 1250 for changing the pathway of the light partially further includes a protective film 1252 for flattening the member 1150 as shown in FIG. 5b.

Figure 8A:
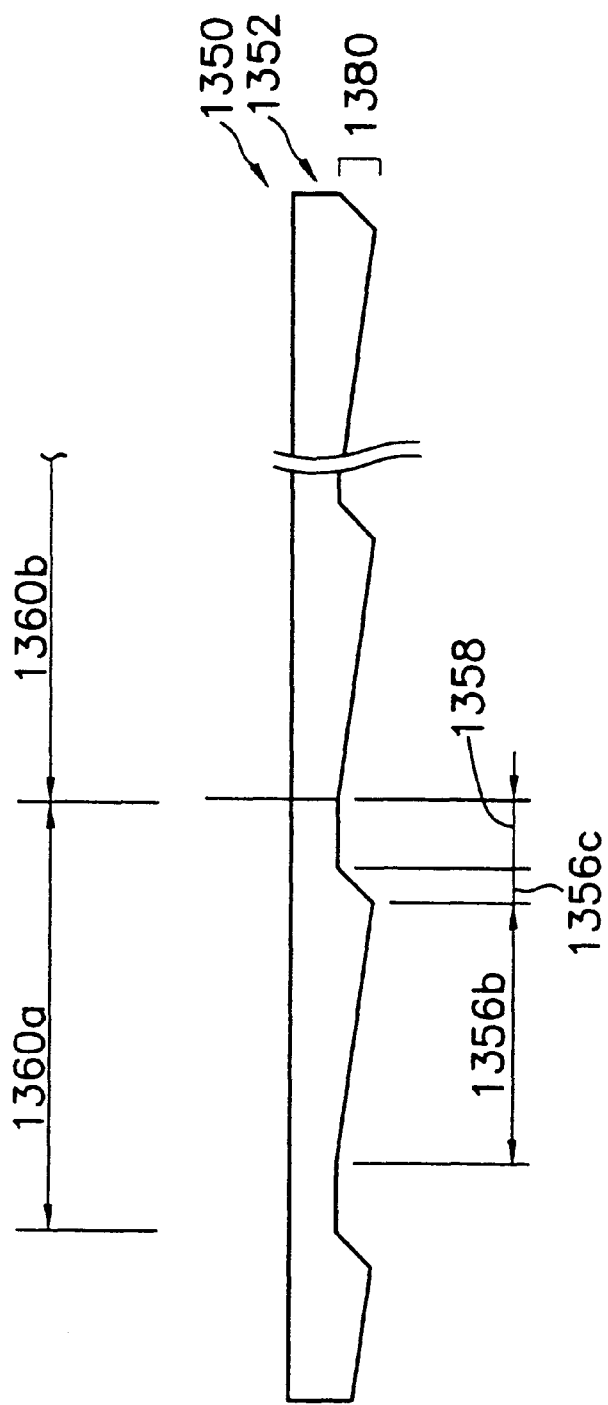
FIGS. 8a and 8b are sectional views of showing a member for changing a pathway of light partially according to seventh and eighth embodiments of the present invention.

FIG. 8A is a sectional view of showing a member 1350 for changing a pathway of light partially according to the seventh embodiment of the present invention. The member 1350 for changing the pathway of the light partially according to the embodiment of the present invention is identical with the member for changing the pathway of the light partially shown in FIG. 7A, except that the light pathway changing unit of the member 1350 for changing the pathway of the light partially further includes a horizontal portion 1358 between the first inclined portion 1356b and the second inclined portion 1356c of the region 1380 for changing the pathway of the light as shown in FIG. 7a. The first inclined portion 1356b, the second inclined portion 1356c, and the horizontal portion 1358 are formed on the transparent base film 1352 as described in FIG. 6A. The first inclined portion 1356b, the second inclined portion 1356c and the horizontal portion 1358 configure single light pathway changing regions 1360a and 1360b respectively having a striped shape.

Figure 8B:
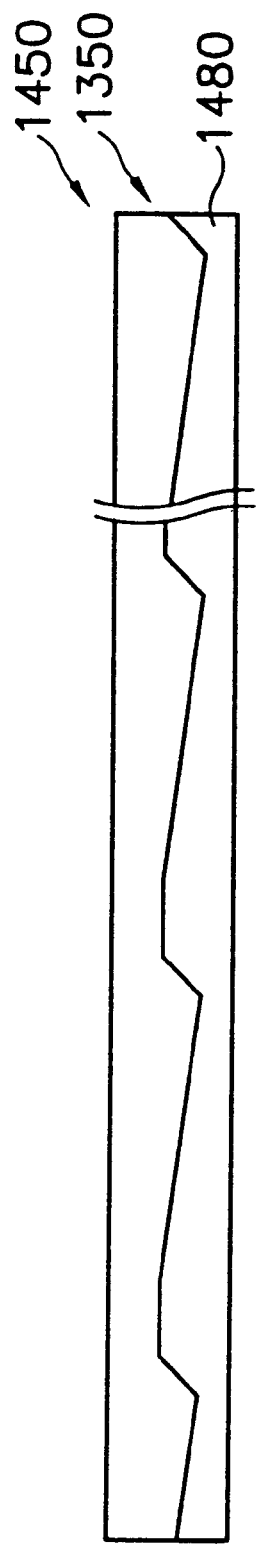

FIG. 8B is a sectional view of showing a member 1450 for changing a pathway of light partially according to the eighth embodiment of the present invention. The member 1450 for changing the pathway of the light partially according to the embodiment of the present invention is identical with the member for changing the pathway of the light partially shown in FIG. 8a, except that the member 1450 for changing the pathway of the light partially further includes a protective film 1452 for flattening the member 1350 for changing the pathway of the light as shown in FIG. 8a.

Figure 9:
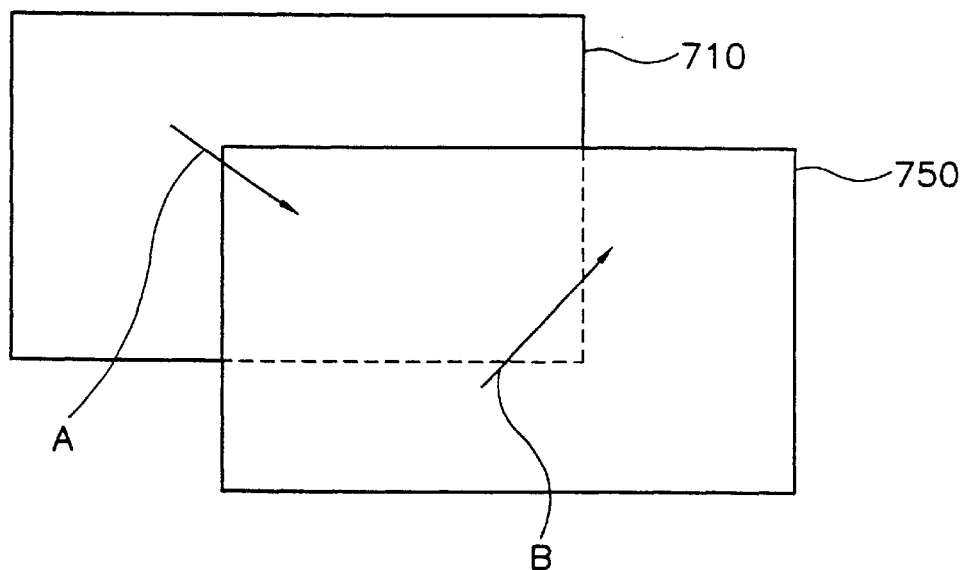
FIG. 9 is a plan view of showing a planar arrangement relation between a thin film transistor board and members for changing the pathway of the light partially show in FIG. 3.

FIG. 9 is a plan view of showing an arrangement of the thin film transistor board 712a and the member 750 for changing the pathway of the light as shown in FIG. 3. In FIG. 9, an arrow A indicates a direction of liquid crystal to be orientated in a twisted nematic mode type of the liquid crystal display panel and an arrow B indicates a lengthwise direction of the striped shaped regions 760a, 760b, . . . for changing the pathway of the light in the member 750 for changing the pathway of the light partially. As shown in FIG. 9, the member 750 for changing the pathway of the light partially is arranged in the lengthwise direction on the liquid crystal display panel and attached to the color filter board 712b so that the lengthwise direction of the member 750 is perpendicular to a tilting direction of a panel on which an electric field is vertically created and which is horizontally arranged.

Even though the relationship of the member 750 and the liquid crystal display panel is described in relation only to the first embodiment of the present invention, it is understood that the relationship of the member for changing the pathway of the light partially and the liquid crystal display panel is preferably applied to the second, third and fourth embodiments of the present invention.

The member 750 for changing the pathway of the light partially can be easily attached to the polarizing plate 715 in a laminating method by means of rollers. Especially, when the adhesive films 850 and 1050 of the members 850 and 1050 for changing the pathway of the light partially according to the second and fourth embodiments of the present invention have an adhesiveness, the adhesive protective films 852 and 1052 attaches the member 750 to the polarizing plate 715 in the laminating method so that the adhesive protective films 852 and 1052 make the members 850 and 1050 come in close contact with the polarizing plate 715.

Hereinafter, a process of forming images in the liquid crystal display device according to the embodiments of the present invention will be described.

As receiving the images signals from an outside of the liquid crystal display panel 712, the integrated and printed circuit board 714, which applies driving signals to the gate lines and the data lines, generates a gate driving signal and a data signal for driving the liquid crystal display device and plural timing signals for applying the gate driving signal and the data signal in time. The gate driving signals are applied through the ductile circuit board 718 for the gate to the gate lines of the liquid crystal display panel 712 and the data signals are applied through the data tape carrier package 716 to the data lines of the liquid crystal display panel 712.

When electric signals are inputted to the data lines and the gate lines, the electric signals are inputted into the source terminals and the gate terminals of the respective thin film transistor. As the electric signals are inputted into the thin film transistors, the thin film transistors are respectively turned-on or turned-off, resulting in outputting the electric signals, which are required to form pixels, to the drain terminals.

When the electricity is applied to the gate terminals and the source terminals of the transistors on the thin film transistor board 712a to turn on the thin film transistors, an electric field is created between the pixel electrodes and the common electrodes of the color filter board 712b. This electric field causes to change an array angle of the liquid crystal injected between the thin film transistor board 712a and the color filter board 712b, resulting in that a light permeability depending on the array angle is also changed.

The light that is generated by the line typed lamp 722 of the backlight assembly 720 disposed under the display unit 710 is transmitted to the light guide plate 724. The light guide plate 724 guides the light to the display unit 710 while changing the pathway of the light.

The light passing through the light guide plate 724 is made to be uniform by means of the optical sheets 726 and is transmitted to the liquid crystal display panel 712. When the light enters the liquid crystal display panel 712, the liquid crystal controls a transmission quantity of the light. The light that has passed though the liquid crystal display panel 712 again passes through the color filter board 712b to form the images. The light forming the images has an improved visual field angle, in which the gray scale inversion is restrained, while passing through the compensative film 713 and the polarizing plate 715, for instance the member 750 for changing the pathway of the light partially. As a result, the light can present the preferred images. Simulations of the gray scale inversion according to the change of the visual field angle.

The member 750 for changing the pathway of the light according to the first embodiment of the present invention was prepared. A phase difference (Δn*d) of the liquid crystal adopted to the liquid crystal display panel 712 was about 0.363 (herein, Δn is a refractive index and d is a gap of liquid crystal cells). An anisotropy (Δε) of the liquid crystal was about 5.9. A pre-tilt angle of the liquid crystal, which is the orientation angle of the liquid crystal, was about 5 in the state of that the electric field in not created and an orientation screen had a left-handed characteristic.

The refractive index of the material used for making the member 750 for changing the pathway of the light partially was about 1.49. A size of the pixel was 300 μm and a width (a pitch) of the single light pathway changing region of the member 750 was 30 μm. The brightness of the light depending on voltages was measured with changing the angles A1 and A2 and the ratio h/H of the height h of the projection 754 and the height H of the prism. Seven values (1.7V, 1.9V, 2.2V, 2.5V, 2.8V, 3.3V and 5.0V) of the voltages were selected in a range of 1.7 voltages to 5.0 voltages and respectively applied to the liquid crystal display panel in order to measure the brightness of the light.

In a phase difference film of the polarizing plate 215, Re was 0 nm, which is presented by an equation d*(Nx-Ny) wherein d is a thickness of the phase difference film, Nx is a refractive index in a direction of an axis x, and Ny is a refractive index in a direction of an axis y, and Rth was 40 nm, which is presented by an equation d*(Nx-Nz) wherein d is a thickness of the phase difference film, Nx is a refractive index in a direction of an axis x, and Nz is a refractive index in a direction of an axis z. The discotic layer that is the compensative film 713 had a refractive index of about 0.05 and a thickness of about 2.0 μm. The discotic liquid crystal had a light axis of which a pole angle was about 7.5 when z=0 and about 52.5 when z=d.

In samples 1, 2, 3, and 4, the inner angle of the projection and the ratio h/H of the height h of the projection and the height H of the prism are presented in a table 1 as follows. Furthermore, a comparative sample 1 that has no the member for changing the pathway of the light partially according to the present invention was used for measuring the brightness of the light and the gray scale inversion in the to liquid crystal display device. A comparative sample 2 was the light pathway changing member in which the ratio h/H of the height h of the projection and the height H of the prism is 1.

TABLE 1

|  | A1/A2 (angles) | Ratio of h/H (%) |
| --- | --- | --- |
| Sample 1 | 45/45 | 30 |
| Sample 2 | 30/30 | 30 |
| Sample 3 | 45/30 | 30 |
| Sample 4 | 45/45 | 60 |
| Comparative sample 1 | — | — |
| Comparative sample 2 | 45/45 | 100 |

Figure 10A:
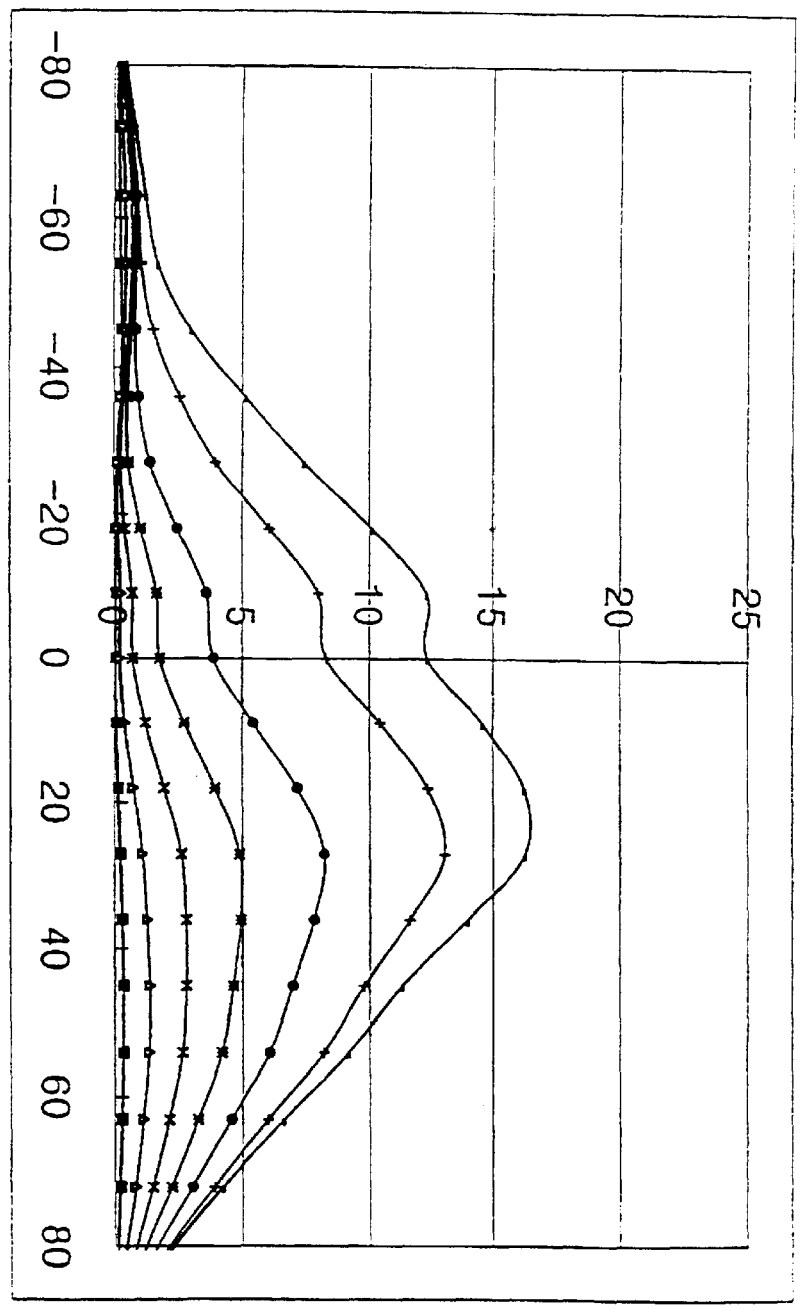
FIGS. 10a to 10c are simulated graphs of showing a variation of a brightness of light in a sample 1, according to a visual field angle.
Figure 10B:
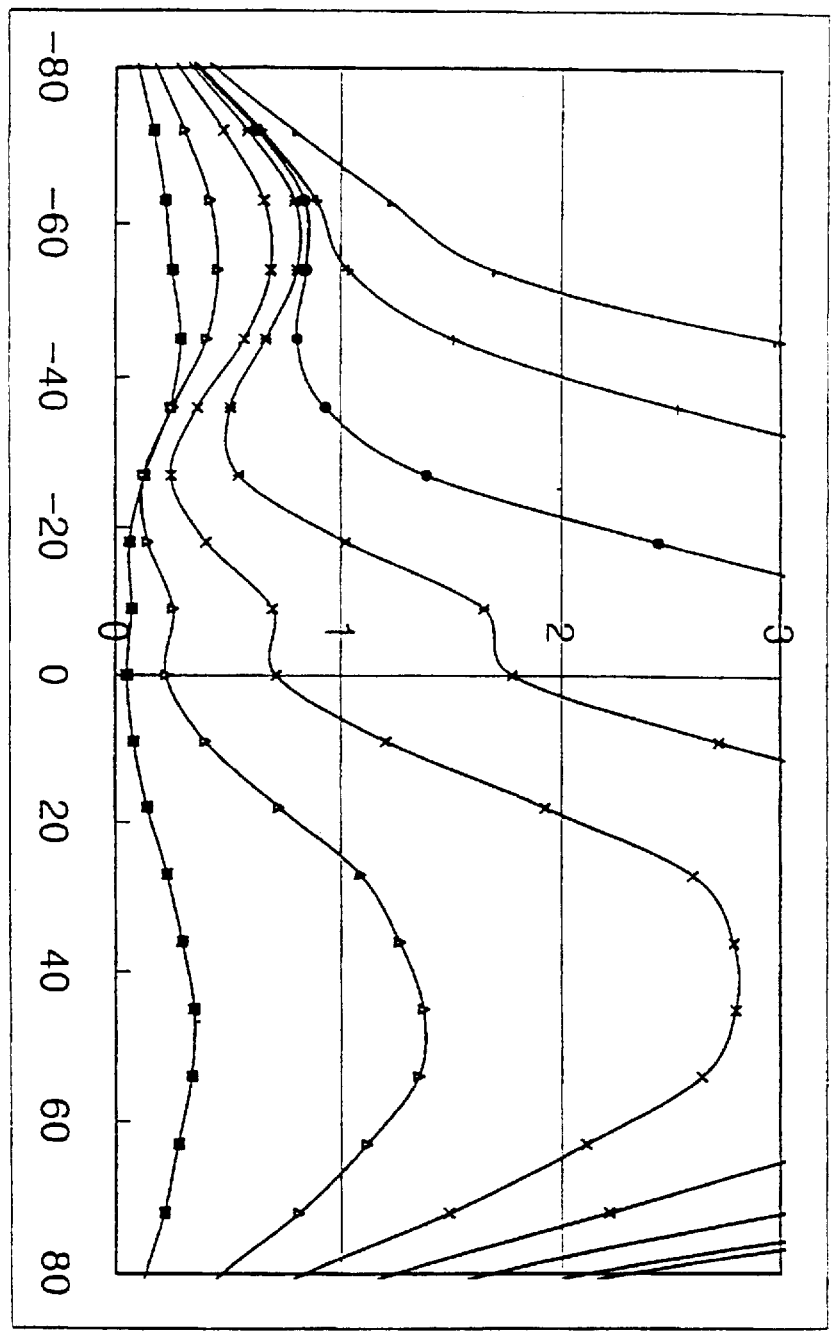
Figure 10C:
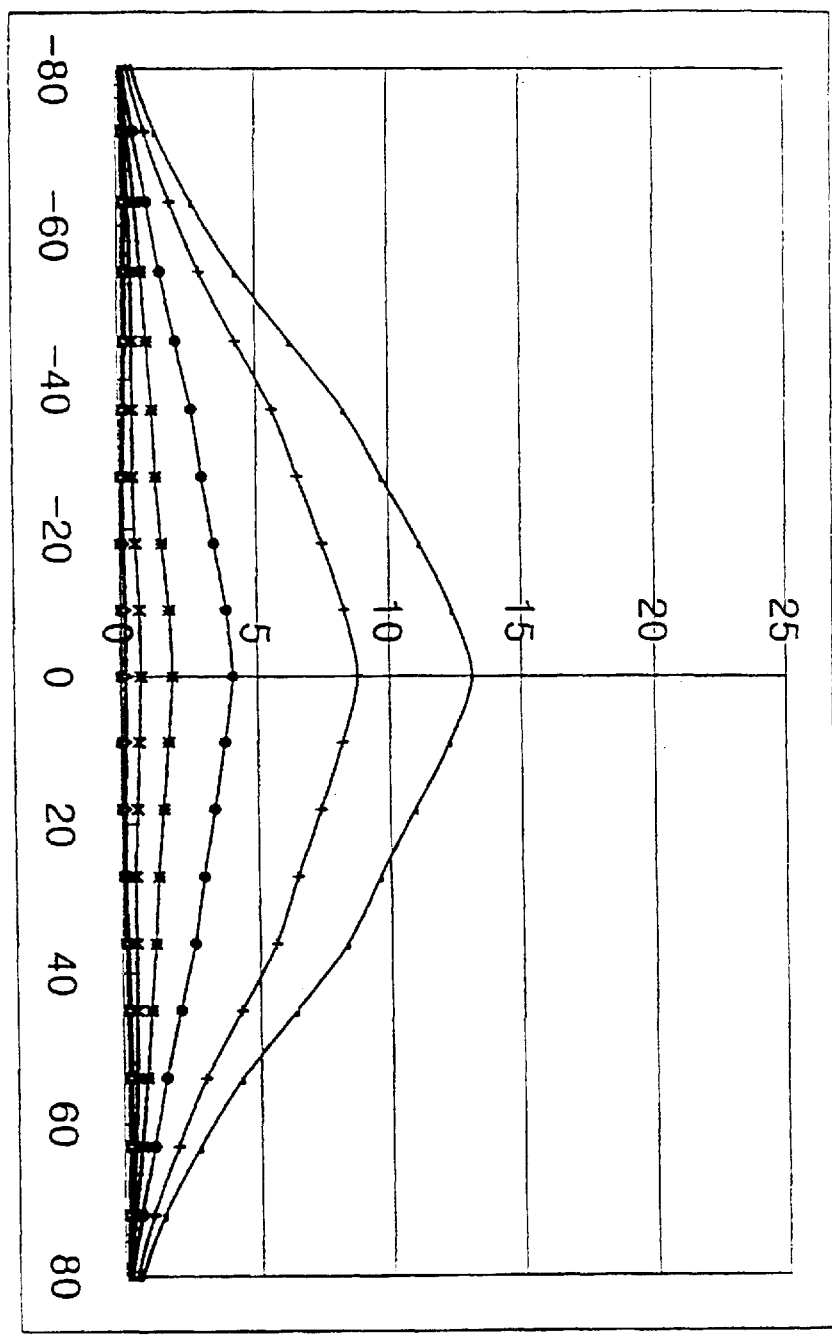
Figure 11A:
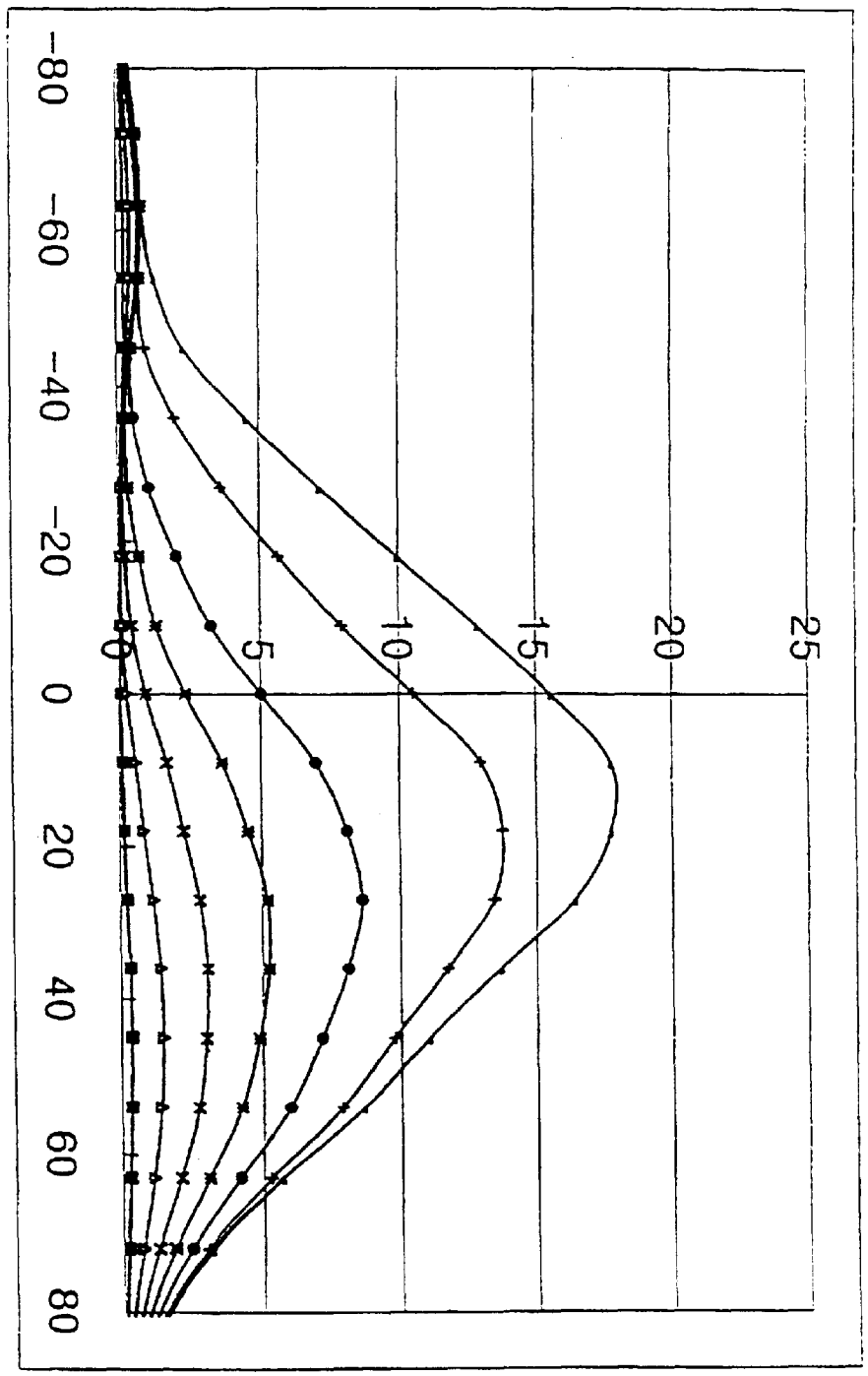
FIGS. 11a and 11c are simulated graphs of showing a variation of a brightness of light in a sample 2, according to the visual field angle.
Figure 11B:
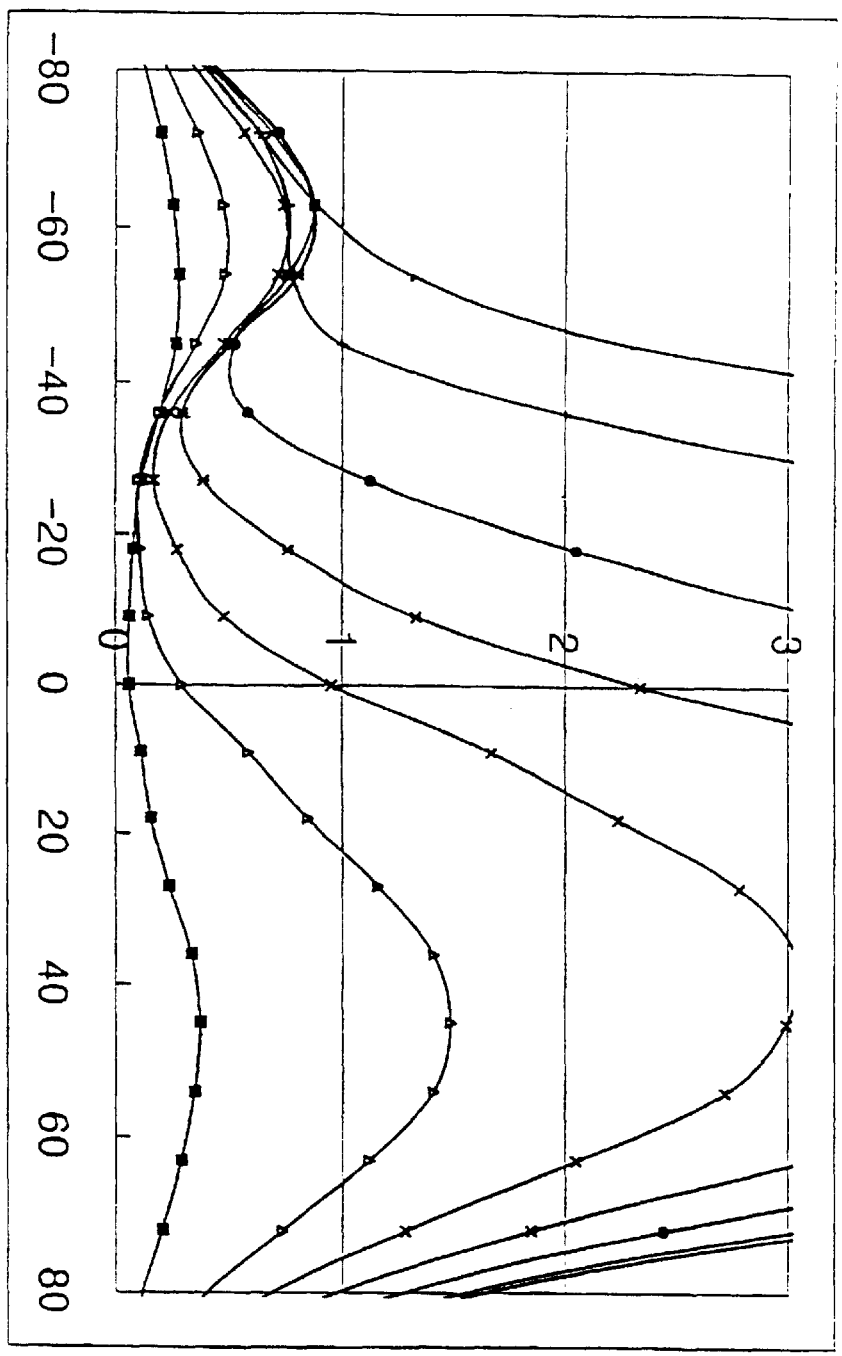
Figure 11C:
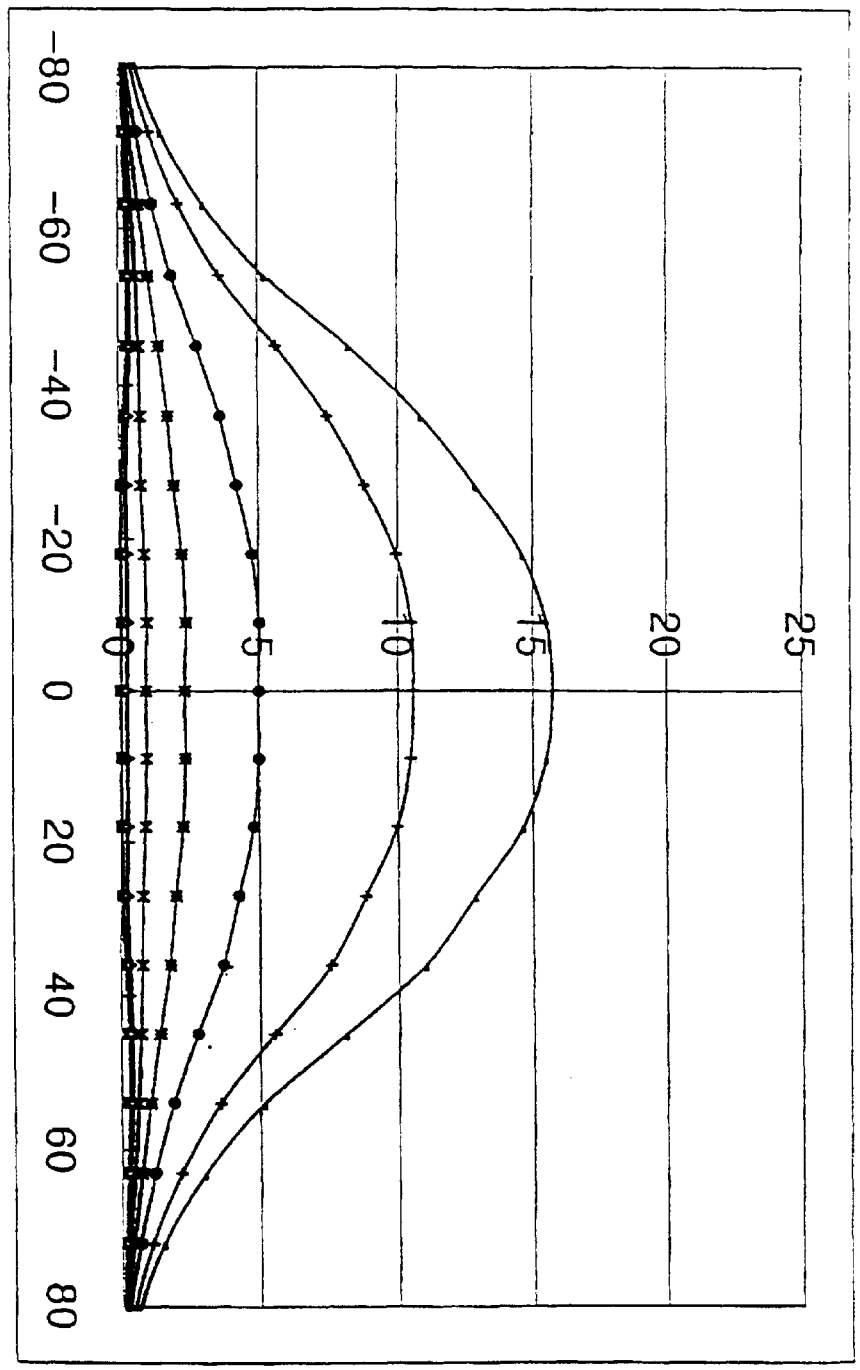
Figure 12A:
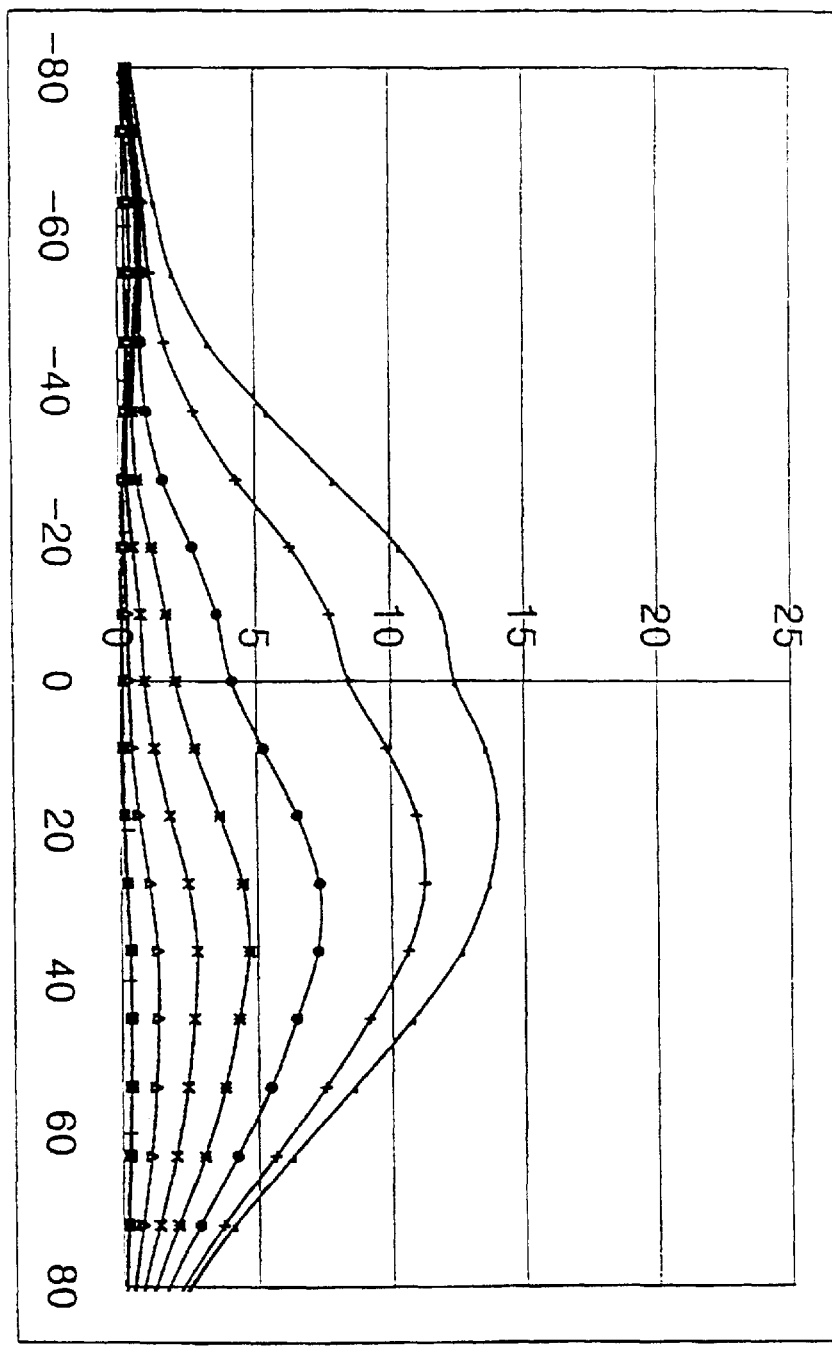
FIGS. 12a to 12c are simulated graphs of showing a variation of a brightness of light in a sample 3, according to the visual field angle.
Figure 12B:
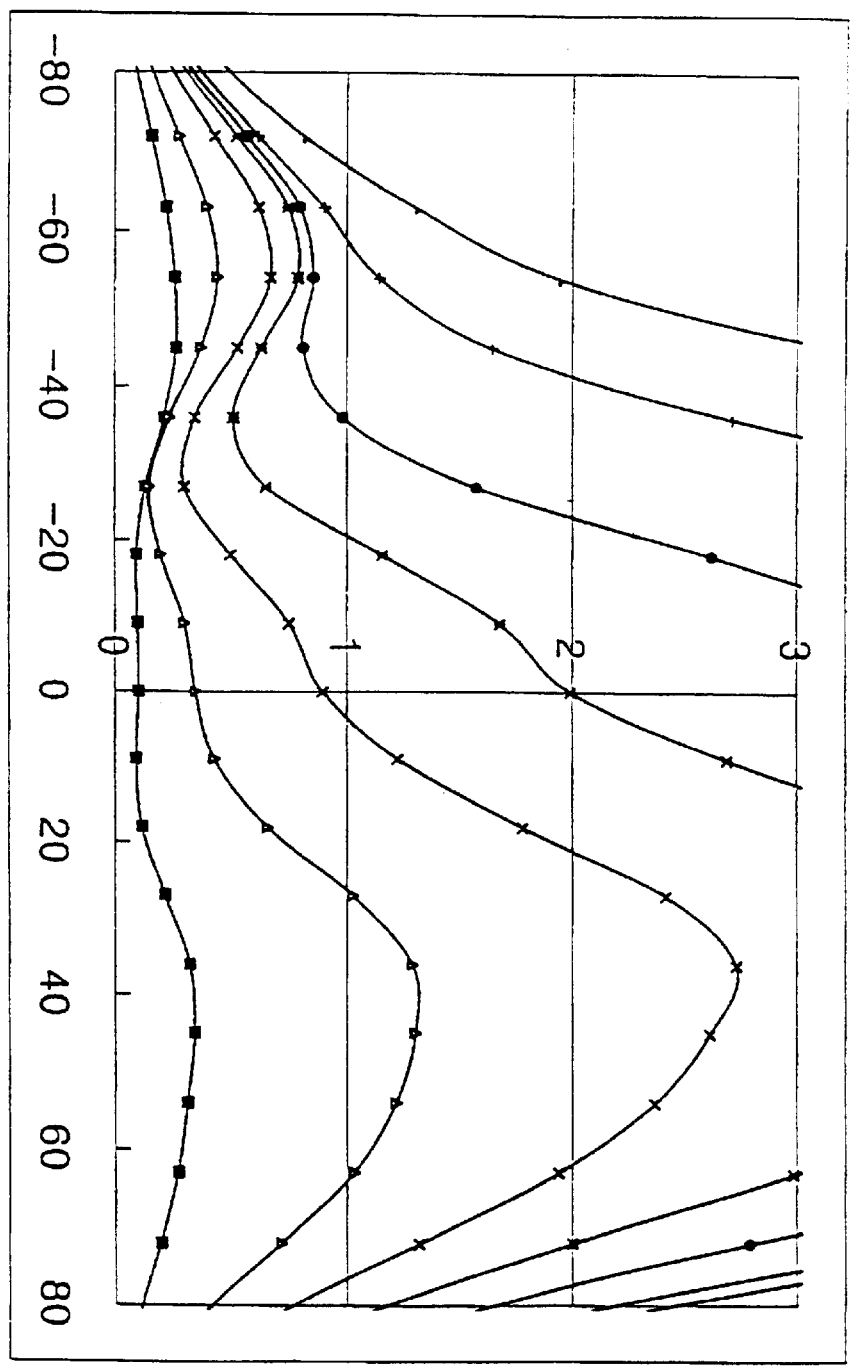
Figure 12C:
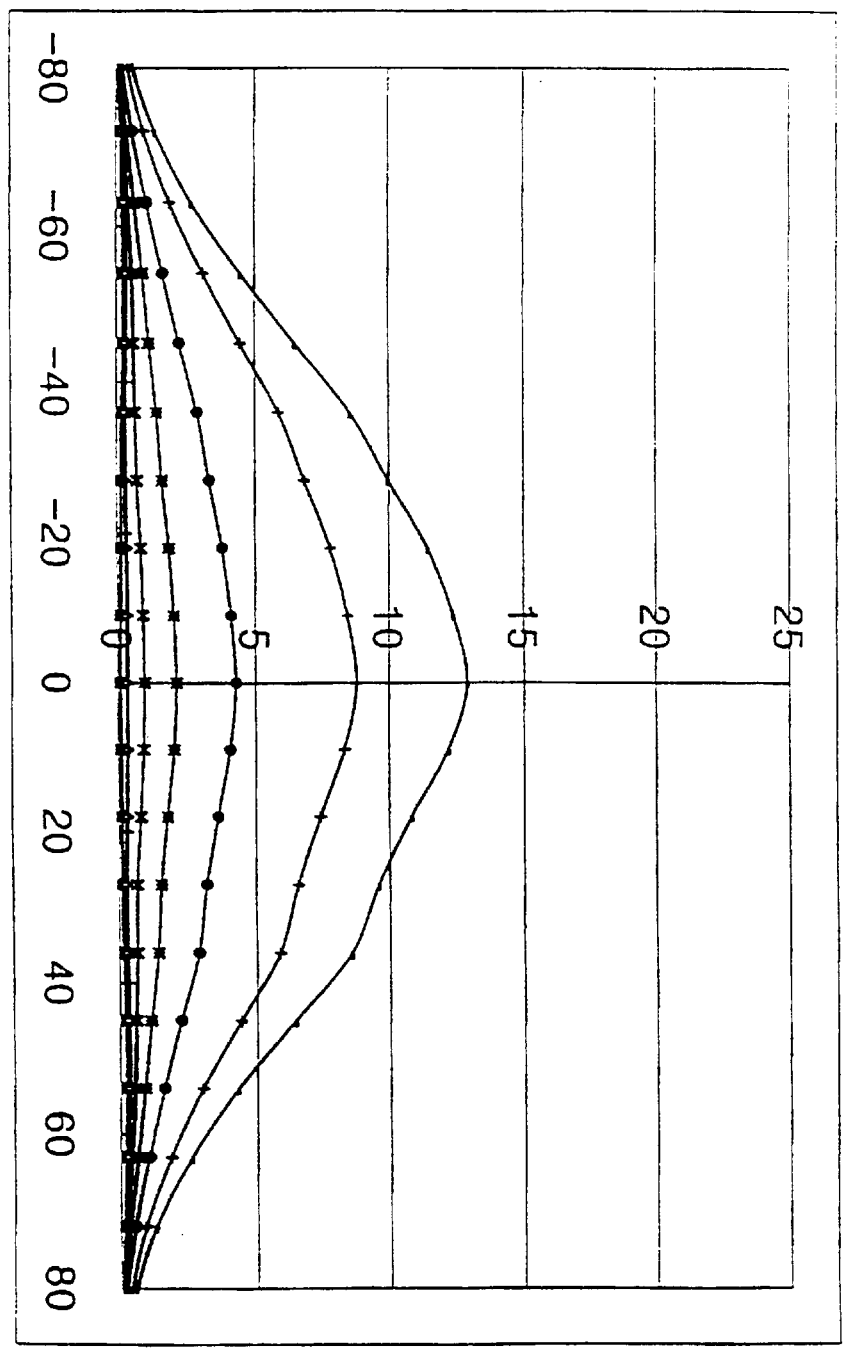
Figure 13A:
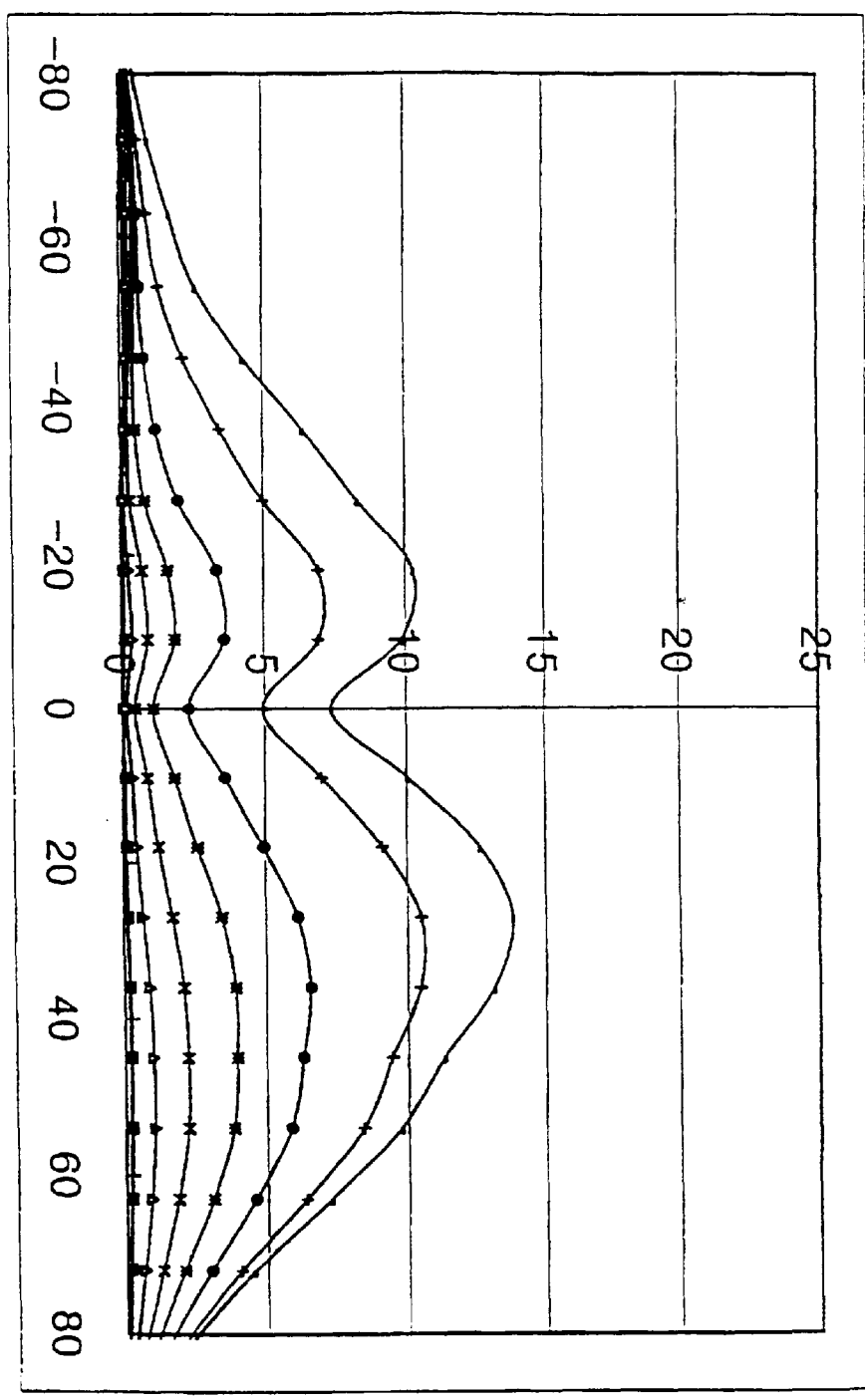
FIGS. 13a to 13c are simulated graphs of showing a variation of a brightness of light in a sample 4, according to the visual field angle.
Figure 13B:
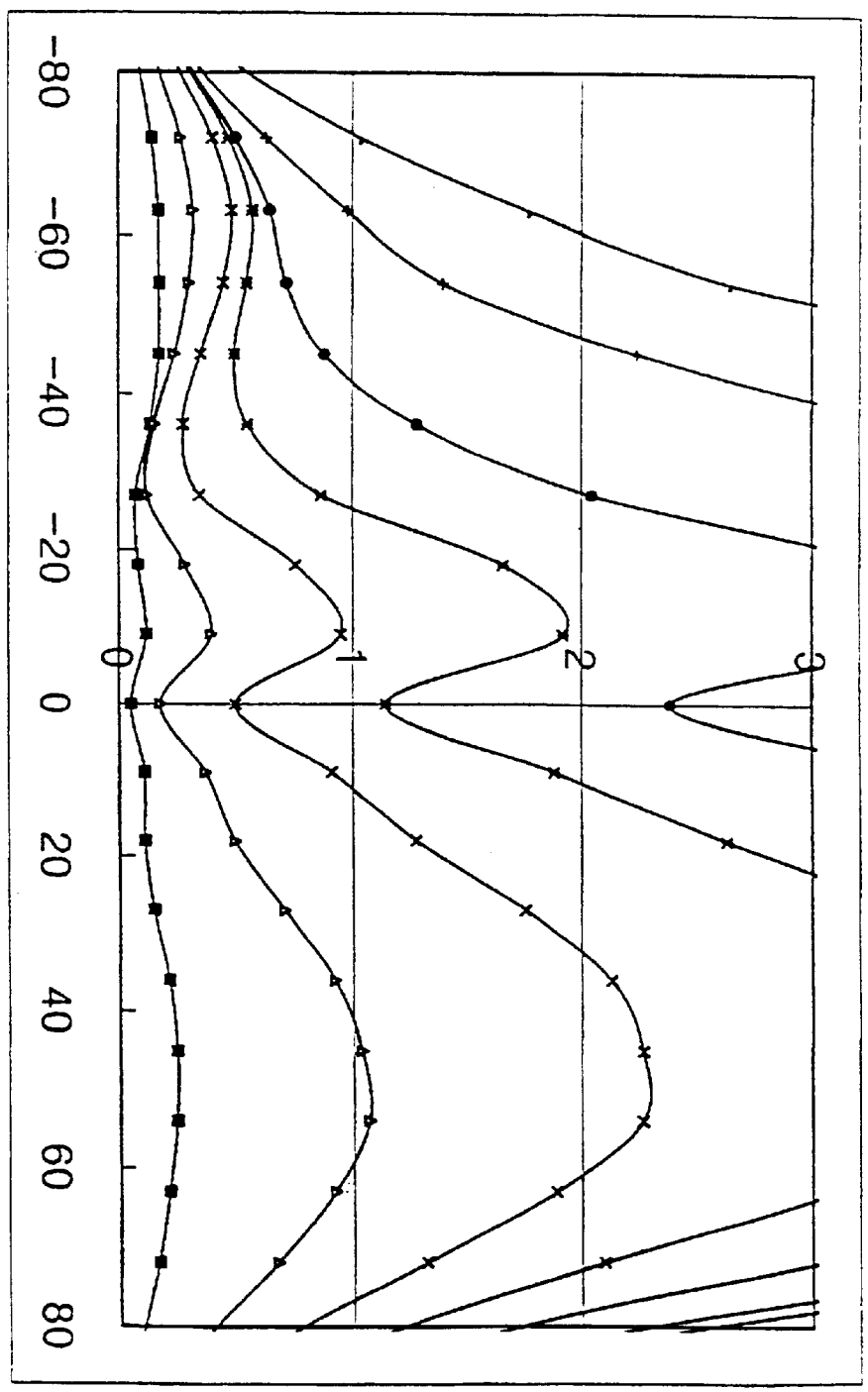
Figure 13C:
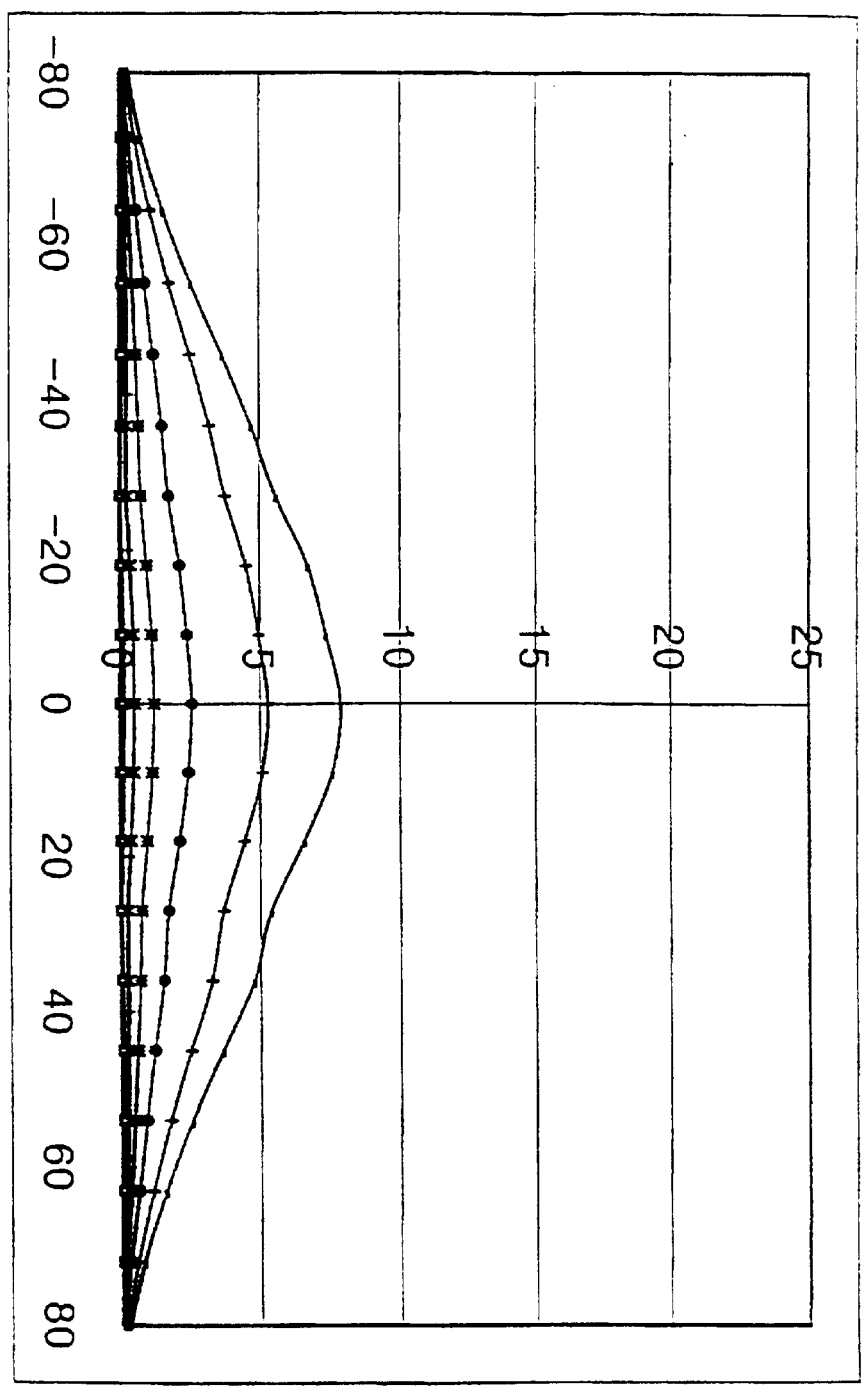
Figure 14A:
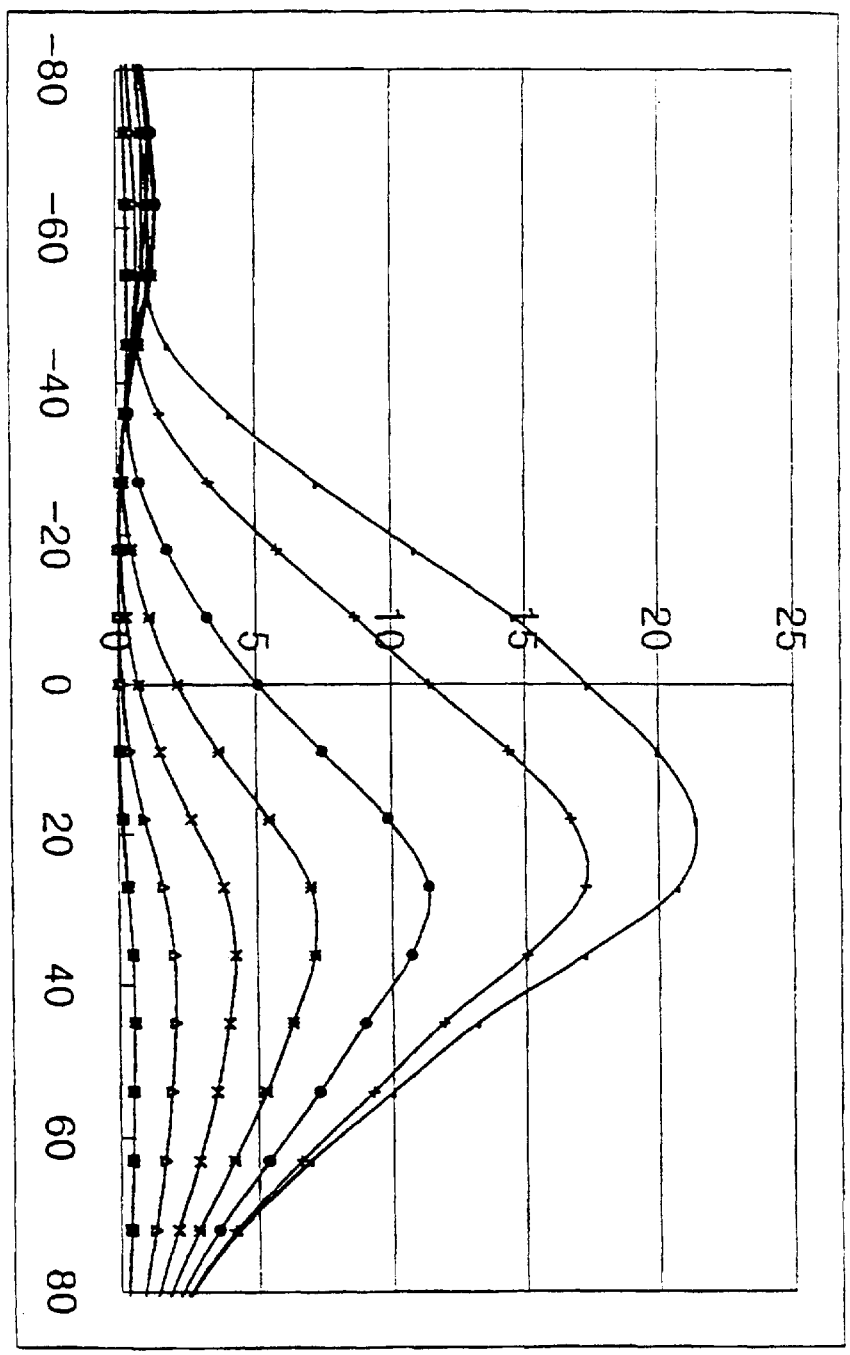
FIGS. 14a to 14c are simulated graphs of showing a variation of a brightness of light in a comparative sample 1, according to the visual field angle.
Figure 14B:
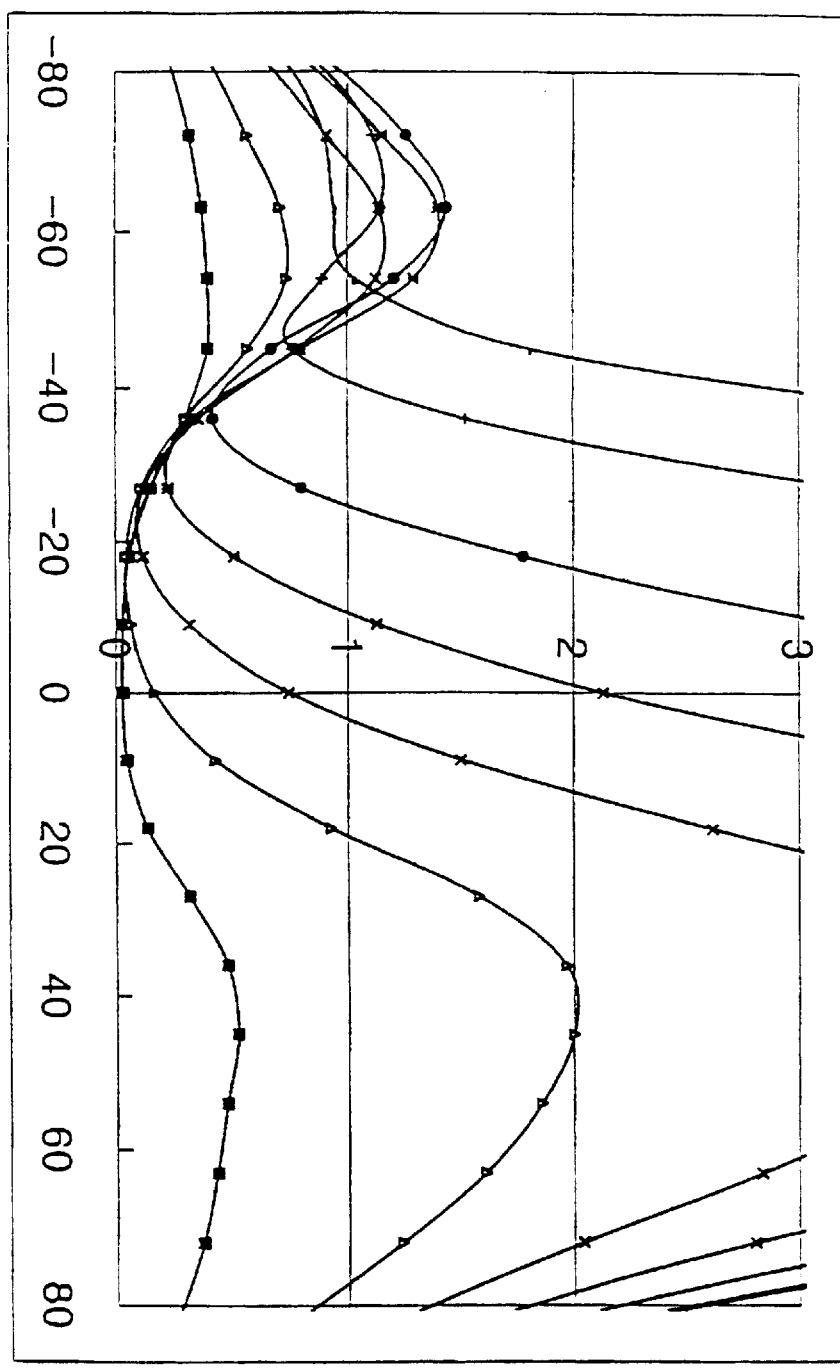
Figure 14C:
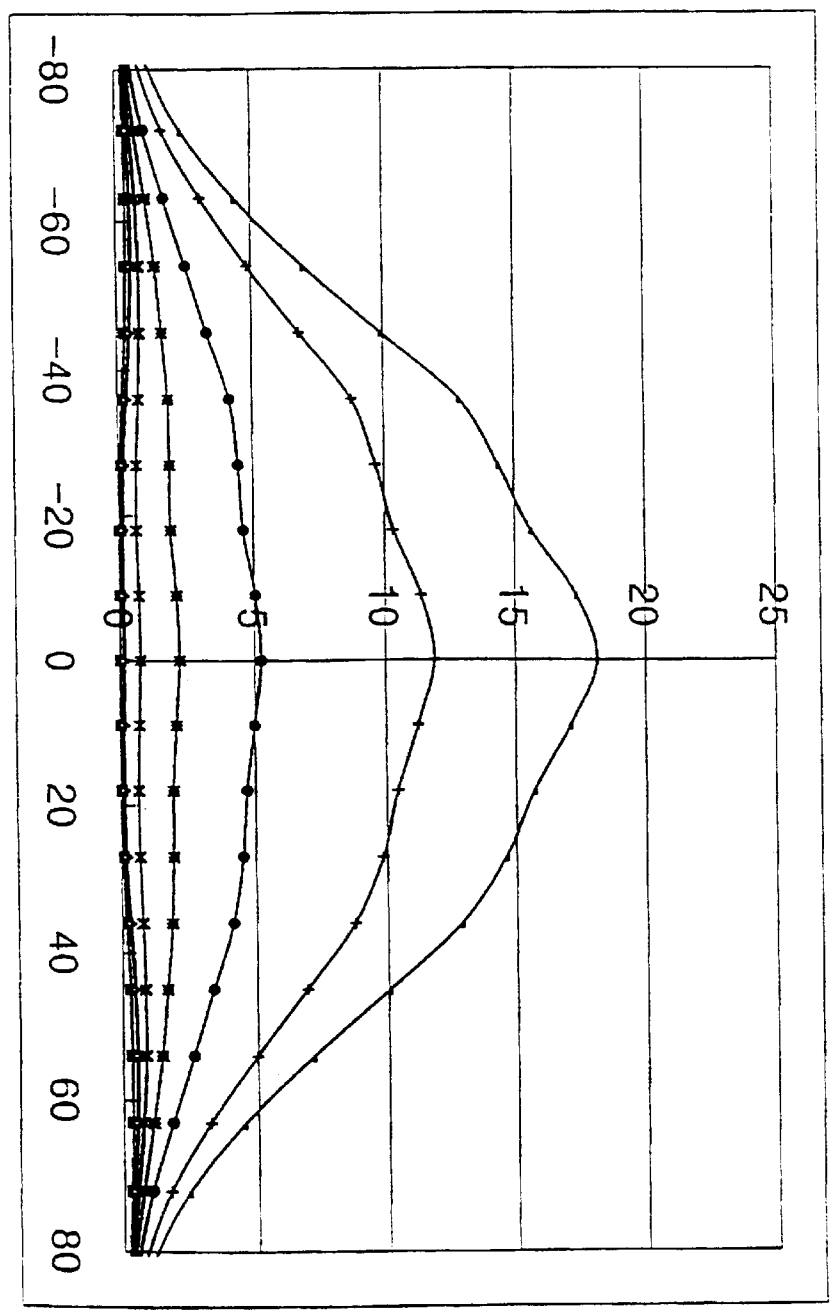
Figure 15A:
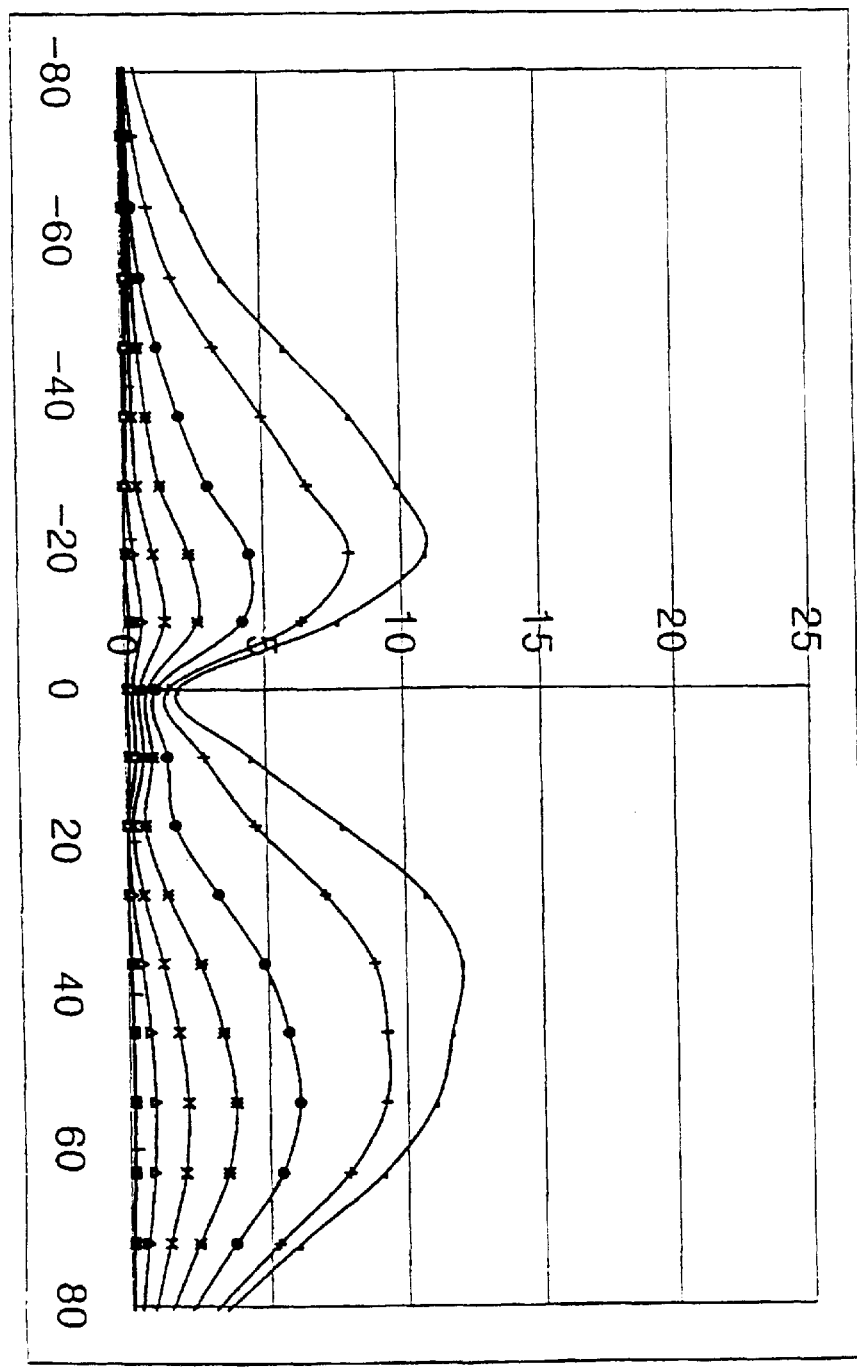
FIGS. 15a to 15c are simulated graphs of showing a variation of a brightness of light in a comparative sample 2, according to the visual field angle.
Figure 15B:
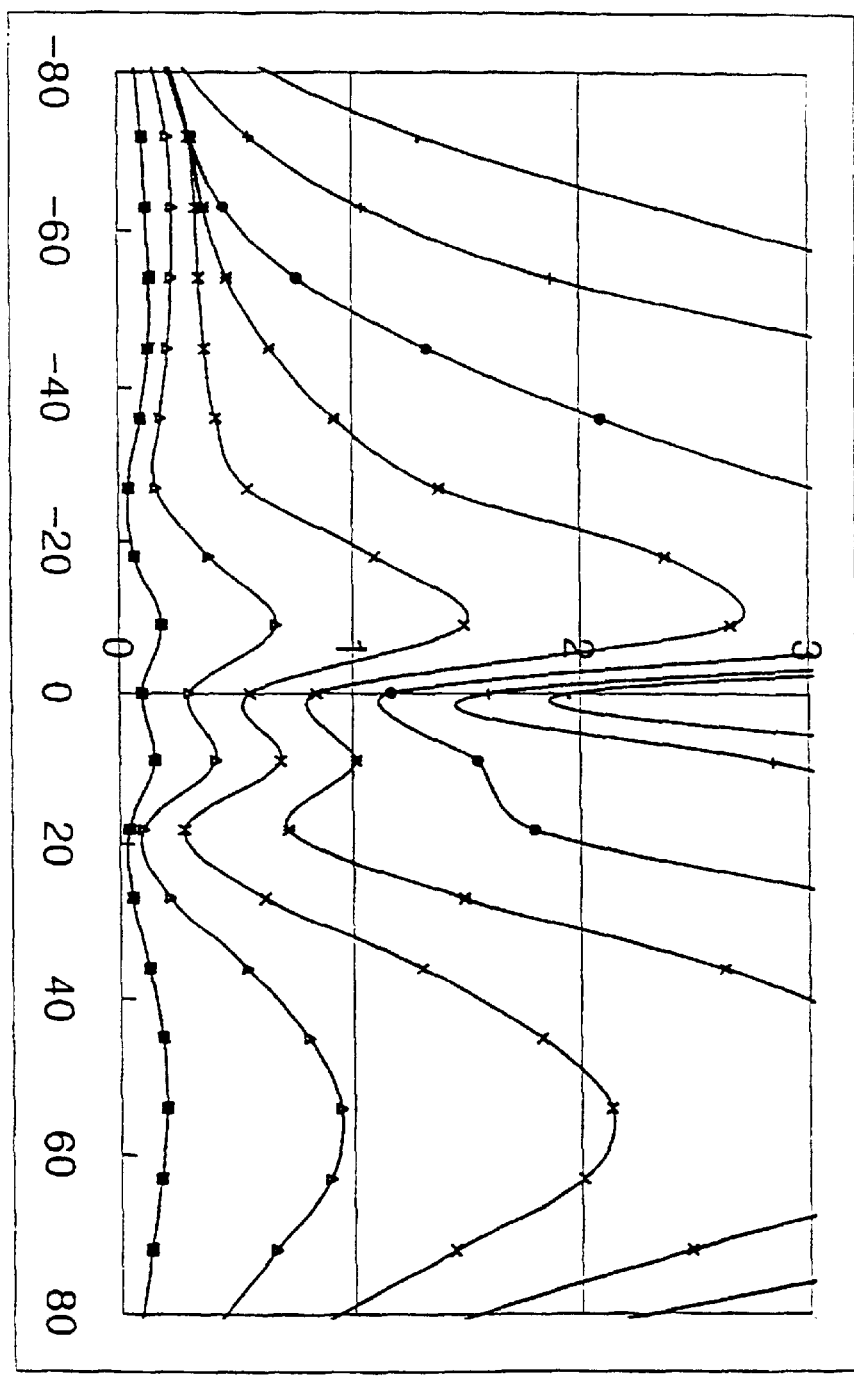
Figure 15C:
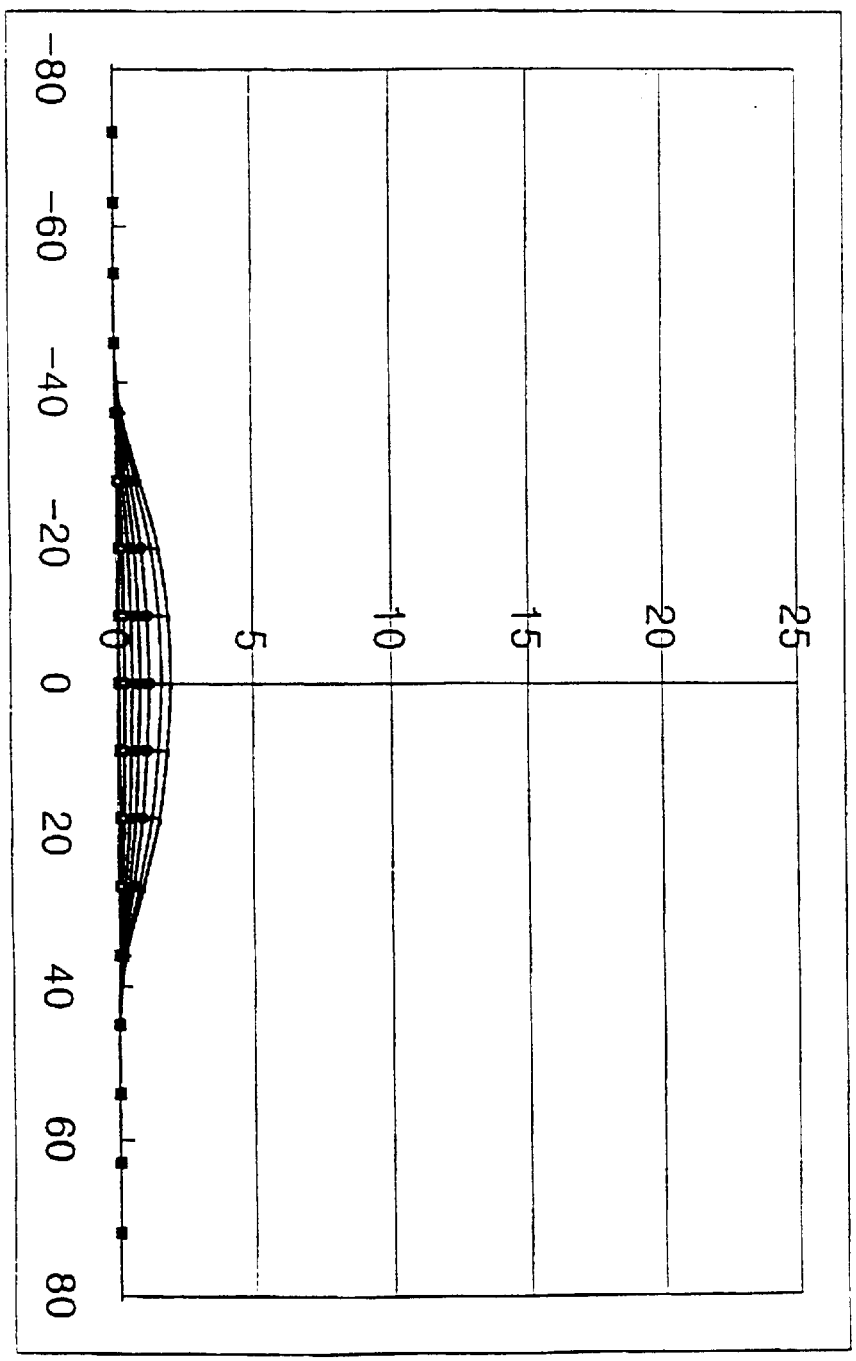

FIGS. 10a to 10c are graphs of showing a change of the brightness of the sample 1 according to the visual field angle. FIGS. 11a to 11c are graphs of showing a change of the brightness of the sample 2 according to the visual field angle. FIGS. 12a to 12c are graphs of showing a change of the brightness of the sample 3 according to the visual field angle. FIGS. 13a to 13c are graphs of showing a change of the brightness of the sample 4 according to the visual field angle. FIGS. 14a to 14c are graphs of showing a change of the brightness of the comparative sample 1 according to the visual field angle. FIGS. 15a to 15c are graphs of showing a change of the brightness of the comparative sample 2 according to the visual field angle.

FIGS. 10a, 11a, 12a, 13a, 14a and 15a respectively show the change of the brightness according to the change of the visual field angle in a vertical direction, FIGS. 10b, 11b, 12b, 13b, 14b and 15b respectively are an exploded view of showing the change of the brightness of FIGS. 10a, 11a, 12a, 13a, 14a and 15a, and FIGS. 10c, 11c, 12c, 13c, 14c and 15c respectively show the change of the brightness according to the change of the visual field angle in a horizontal direction.

Referring to FIGS. 14A to 14C, it can be understood that in the case of the comparative sample 1 without the light pathway changing member according to the present invention, the brightness increases in the horizontal direction according to the change of the visual field angle as the applied voltage is increased, but the gray scale inversion is broken out near the angle of −40 degrees in the vertical direction.

Meanwhile, referring to FIGS. 15a to 15c, since the member for changing the pathway of the light partially does not have the first horizontal portion to move the part of the light straight, the brightness is degraded in the vertical and horizontal directions at a center portion of the liquid crystal display panel.

Meanwhile, referring to FIGS. 10A to 13C, in the liquid crystal display device having the member for changing the pathway of the light partially according to the embodiments of the present invention, the brightness is preferably changed in the vertical and horizontal directions. Especially, as shown in FIGS. 10b, 11b, 12b and 13b, the gray scale inversion hardly occurs.

According to the present invention, when the light passing through the liquid crystal is transmitted through the member for changing the pathway of the light partially, the part of the light is transmitted in the same direction as the light proceeds straight and the rest of the light is refracted and transmitted in the changed direction. Since the part of the light is transmitted straight and the rest of the light is transmitted along the changed pathway, the brightness in the center portion of the liquid crystal display panel is excellent and also the brightness in the vertical and horizontal directions is improved. Furthermore, the gray scale inversion phenomenon in which the brightness is decreased when the voltage increases is restrained by means of the light of which the part is refracted and transmitted along the change pathway, resulting in displaying the images having a desired quality.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A display device comprising:
    a display panel for displaying images;
    a backlight assembly for providing light to the display panel; and
    means for changing a pathway of the light partially so that a part of the light is substantially transmitted in the same direction as the light proceeds while a rest of the light is transmitted through a changed pathway, in order to change a brightness of the light according to a visual field angle of the display panel to restrain a gray scale inversion of the images while the light passes through the display panel to make the images on the display panel, the means being disposed on the display panel.

2. An apparatus for changing a pathway of light, wherein the apparatus changes a pathway of the light partially so that a part of the light is substantially transmitted in the same direction as the light proceeds while a rest of the light is transmitted through a changed pathway, in order to change a brightness of the light according to a visual field angle of the display panel to restrain a gray scale inversion of the images while the light passes through the display panel to make the images on the display panel.

3. A film sheet for use in a display device comprising:

a transparent base film; and a stepped portion having inclined side portions formed on a surface of the transparent base film, wherein a part of light is substantially transmitted in the same direction as the light proceeds while the rest of the light is transmitted through a changed pathway in order to change a brightness of the light according to a visual field angle of a display panel to restrain a gray scale inversion of the images while the light passes through the transparent base film.

4. A liquid crystal display device comprising:

a liquid crystal display panel for receiving light to display images, the light crystal display panel including a first transparent substrate, a second transparent substrate mounted to face to the first transparent substrate and liquid crystal injected between the first transparent substrate and the second transparent substrate;

a backlight assembly for providing the light to the liquid crystal display panel through the first transparent substrate; and means for changing a pathway of the light partially so that a part of the light is substantially transmitted in the same direction as the light proceeds while a rest of the light is transmitted through a changed pathway, in order to improve a contrast ratio of the images displayed on the liquid crystal display panel while the light passes through the liquid crystal display panel, the device be disposed on an outer surface of the second transparent substrate.

5. A liquid crystal display device as claimed in claim 4, wherein said light pathway partially changing means includes a first region having a striped shape to transmit the part of the light in the same direction as the light proceeds, a second region which is provided at a first side of the first region, for changing a pathway of a first part of the rest part of the light in a first direction, and a third region which is provided at a second side of the first region, for changing a pathway of a second part of the rest of the light in a second direction opposing to the first direction.

6. A liquid crystal display device as claimed in claim 5, wherein the first, second and third regions define one light pathway changing region having a striped shape, and said light pathway partially changing means includes a plurality of said light pathway changing regions.

7. A liquid crystal display device as claimed in claim 6, wherein a width of the light pathway changing region is smaller than a length of a unit pixel.

8. A liquid crystal display device as claimed in claim 6, wherein a fourth is region having the striped shape to transmit the light in the same direction as the light proceeds is formed between a first light pathway changing region and a second light pathway changing region adjacent to the first light pathway changing region.

9. A liquid crystal display device as claimed in claim 4, wherein the light pathway partially changing means includes a transparent base film and a projection having a striped shape, in which the projection has a first horizontal portion which is formed in the striped shape on one surface of the transparent base film, for transmitting a part of the light in the same direction as the light proceeds, a first inclined portion which is provided at a first side of a first region, for changing a pathway of a first rest part of the light in a first direction, and a second inclined portion which is provided at a second side of the first region, for changing a second rest of the light in a second direction opposing to the first direction.

10. A liquid crystal display device as claimed in claim 9, wherein a plurality of the stripe-shaped projections is formed in parallel with one another.

11. A liquid crystal display device as claimed in claim 10, wherein a second horizontal portion having a striped shape is formed in parallel with the first horizontal portion between the plural striped-shape projections to transmit the light in the same direction as the light proceeds.

12. A liquid crystal display device as claimed in claim 9, wherein the first inclined portion and the second inclined portion extend from the transparent base film to form a mesa type of a projection along with the horizontal portions.

13. A liquid crystal display device as claimed in claim 12, wherein an inner angle defined by an extended line from a bottom side of the mesa typed projection and the first and second inclined portions is about 10 degree to 80 degree.

14. A liquid crystal display device as claimed in claim 12, wherein a ratio of a height of the projection to a length from a point at which an extended line of the first inclined portion intersects an extended line of the second inclined portion to a bottom side of the mesa typed projection is about 0.05~0.7:1.

15. A liquid crystal display device as claimed in claim 9, wherein the mesa typed projection and the transparent base film are comprised of a same transparent material.

16. A liquid crystal display device as claimed in claim 15, wherein a refractive index of the light pathway partially changing means is about more than 1.4.

17. A liquid crystal display device as claimed in claim 9, wherein the light pathway partially changing means further includes a transparent protective film which is disposed on the transparent base film so as to cover the projection and to flatten the transparent base film.

18. A liquid crystal display device as claimed in claim 17, wherein a reflective index of a first material of the transparent base film is about more than 1.5 and the reflective index of a second material of the protective film is about less than 1.35.

19. A liquid crystal display device as claimed in claim 18, wherein the first material is a photosensitive polymer type material and the second material is a fluorine-containing polymer type material.

20. A liquid crystal display device as claimed in claim 19, wherein the second material has an adhesiveness.

21. A liquid crystal display device as claimed in claim 4, wherein the light pathway partially changing means is arranged in a direction of a length and attached to the second transparent substrate of the liquid crystal display panel in perpendicular to an average tilting direction of the liquid crystal in a horizontally oriented panel having a vertical electric field.

22. A liquid crystal display device, comprising:

a liquid crystal display panel for receiving light to display images;

a back light assembly for providing the light to the liquid crystal display panel; and a transparent base film including at least one portion having at least one angled surface for substantially restraining gray scale inversion, wherein the transparent base film is formed on a polarizing plate and the liquid crystal display device is a transmissive type display.

* * * * *